United States Patent
Sun et al.

(10) Patent No.: US 11,778,666 B2
(45) Date of Patent: Oct. 3, 2023

(54) COORDINATED SPATIAL REUSE

(71) Applicant: QUALCOMM Incorporated, San Diego, CA (US)

(72) Inventors: Yanjun Sun, San Diego, CA (US); George Cherian, San Diego, CA (US); Alfred Asterjadhi, San Diego, CA (US); Sai Yiu Duncan Ho, San Diego, CA (US); Abhishek Pramod Patil, San Diego, CA (US); Gaurang Naik, San Diego, CA (US); Abdel Karim Ajami, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/651,401

(22) Filed: Feb. 16, 2022

(65) Prior Publication Data

US 2023/0262763 A1    Aug. 17, 2023

(51) Int. Cl.
*H04W 72/12* (2023.01)
*H04W 74/08* (2009.01)
(Continued)

(52) U.S. Cl.
CPC ....... *H04W 74/0816* (2013.01); *H04W 16/10* (2013.01); *H04W 72/54* (2023.01); *H04L 5/0055* (2013.01)

(58) Field of Classification Search
CPC ..... H04W 16/10; H04W 16/14; H04W 88/08; H04W 72/12; H04W 72/20;
(Continued)

(56) References Cited

U.S. PATENT DOCUMENTS

| 2020/0076552 A1* | 3/2020 | Cherian | ................ H04L 5/0007 |
| 2020/0077273 A1* | 3/2020 | Cherian | ................ H04W 74/06 |

(Continued)

OTHER PUBLICATIONS

Cherian G., (QUALCOMM) et al., "Coordinated AP Time and Frequency Sharing in a Transmit Opportunity in 11be", IEEE Draft, 11-19-1582-02-00BE-Coordinated-AP-Time-and-Frequency-Sharing-In-A-Transmit-Opportunity-in-11be, IEEE-SA Mentor, Piscataway, NJ, USA, vol. 802.11 EHT, 802.11be, No. 2, Jan. 14, 2020, pp. 1-15, XP068165239, pp. 3-10.

(Continued)

*Primary Examiner* — Liton Miah
(74) *Attorney, Agent, or Firm* — Holland & Hart / Qualcomm

(57) ABSTRACT

In some implementations, a first access point (AP) selects one or more other APs for participation with the first AP in a coordinated access point transmission session. The first AP obtains a transmission opportunity (TXOP), and transmits a frame indicating scheduling information for uplink (UL) or downlink (DL) transmissions to or from the selected APs, the scheduling information indicating a respective start time for the UL or DL transmissions to or from the selected APs, at least two of the start times being offset from one another by a time period associated with decoding a preamble of a wireless packet. The first AP transmits or receives wireless packets to or from one or more associated stations (STAs) at least partially concurrently with the transmission or reception of wireless packets by the selected APs to or from their respective associated STAs based on the scheduling information.

30 Claims, 18 Drawing Sheets

(51) Int. Cl.
*H04W 16/10* (2009.01)
*H04W 72/54* (2023.01)
*H04L 5/00* (2006.01)

(58) Field of Classification Search
CPC ......... H04W 72/1205; H04W 72/1278; H04W 72/54; H04W 74/0816
See application file for complete search history.

(56) References Cited

U.S. PATENT DOCUMENTS

2021/0194659 A1\* 6/2021 Sevin .................... H04L 5/0064
2021/0282161 A1   9/2021 Sun
2021/0307099 A1\* 9/2021 Ryu ...................... H04L 1/1614
2023/0027444 A1\* 1/2023 Hart .................. H04W 74/0808

OTHER PUBLICATIONS

International Search Report and Written Opinion—PCT/US2023/012111—ISA/EPO—dated Apr. 12, 2023.

\* cited by examiner

COORDINATED SPATIAL REUSE

TECHNICAL FIELD

This disclosure relates generally to wireless networks, and more specifically, to coordinating spatial reuse transmissions to or from multiple access points (APs) associated with different basic service sets (BSS).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Many wireless networks use random channel access mechanisms during which wireless devices (including APs and STAs) contend with each other to gain access to the wireless medium. The wireless device that wins the contention operation becomes the owner of a transmission opportunity (TXOP) and may use the wireless medium for a duration of the TXOP. Other wireless devices are typically prevented from transmitting data during the TXOP, for example, to prevent interference with transmissions from the TXOP owner. The 802.11ax, 802.11be, and later amendments to the IEEE 802.11 family of wireless communication standards allow an AP that obtains a TXOP on the wireless medium to share some or all of the obtained TXOP with one or more STAs that are associated with the AP.

An AP associated with a first BSS may operate in the presence of other APs that belong to other BSSs different than the first BSS. There is typically a lack of coordination between the first AP and the other APs, and transmissions associated with these other, overlapping BSSs (OBSSs) can interfere with transmissions associated with the first BSS. Although spatial reuse (SR) techniques may allow the first AP to transmit data to its associated STAs in the presence of OBSS interference, the lack of coordination between SR transmissions and OBSS transmissions may limit the extent to which OBSSs can operate in the vicinity of one another.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication by a first access point (AP) associated with a first basic service set (BSS). In some implementations, the method includes selecting one or more other APs for participation with the first AP in a coordinated access point transmission session on a wireless medium, the one or more selected APs associated with other respective BSSs that are different than the first BSS. The method may include obtaining a transmission opportunity (TXOP) on the wireless medium, and transmitting a frame indicating scheduling information for uplink (UL) or downlink (DL) transmissions to or from each of the selected APs during at least a portion of the TXOP obtained by the first AP, the scheduling information indicating a respective start time for the respective UL or DL transmissions to or from each of the selected APs during at least the portion of the TXOP obtained by the first AP, at least two of the start times being offset from one another by a time period associated with decoding a preamble of a wireless packet. The method may include transmitting or receiving one or more wireless packets to or from one or more STAs associated with the first AP at least partially concurrently with the transmission or reception of one or more respective wireless packets by each of the selected APs to or from one or more respective STAs associated with the respective APs based on the scheduling information. In some aspects, the frame indicates whether the coordinated access point transmission session is designated for UL transmissions or DL transmissions.

In various implementations, the respective start times of the UL or DL transmissions to or from the selected APs are based at least in part on one or both of signal strengths of wireless packets received by the first AP from the selected APs or levels of interference associated with the selected APs. In some instances, the respective start times of the UL or DL transmissions to or from at least some of the selected APs are the same as one another based at least in part on the respective signal strengths or levels of interference associated with the at least some selected APs being less than a value. In some other instances, the respective start times of the UL or DL transmissions to or from the at least two selected APs are offset from one another by the time period based at least in part on the respective signal strengths or levels of interference associated with the at least two selected APs being greater than a value.

In some implementations, the scheduling information may also indicate one or more of a respective modulation and coding scheme (MCS) to be used for the UL or DL transmissions to or from each of the selected APs, a respective transmit power level to be used for the UL or DL transmissions to or from each of the selected APs, or a respective duration of the UL or DL transmissions to or from each of the selected APs. In some instances, the respective durations of the UL or DL transmissions to or from the selected APs may be the same. In other instances, the respective durations of the UL or DL transmissions to or from the selected APs may be different from one another by a second time period. In some aspects, the second time period may be associated with decoding a preamble of an acknowledgement (ACK) frame or a block acknowledgement (BA) frame.

In other implementations, the frame may also indicate a respective duration of ACK frames or BA frames to be sent by the one or more STAs associated with a respective AP of the selected APs. In some instances, the respective durations of the ACK frames or BA frames may be the same as one another. In other instances, the respective durations of the ACK frames or BA frames may be offset in time from one another.

In various implementations, the method also includes transmitting a poll frame to a plurality of APs associated with BSSs different than the first BSS. The method may also include receiving a request, from one or more of the plurality of APs responsive to the poll frame, for the first AP to share a portion of the obtained TXOP with the respective AP. The method may also include selecting the one or more APs for participation in the coordinated access point transmission session based on the received requests. In some implementations, the method also includes selectively adjusting a length or duration of each of the one or more wireless packets transmitted to or received from the one or more STAs associated with the first AP based at least in part on one or more of the respective signal strengths of wireless packets received by the first AP from the selected APs, the respective levels of interference associated with the selected APs, or respective decoding error rates of the first AP and the selected APs. In some instances, the frame includes instructions for each of the selected APs to transmit the scheduling information to the one or more respective STAs associated with the respective selected AP. In some aspects, the scheduling information is transmitted to the one or more STAs associated with the first AP as a respective plurality of non-high-throughput (HT) duplicates over a corresponding plurality of subchannels of the wireless medium.

Another innovative aspect of the subject matter described in this disclosure can be implemented in a wireless communication device. The wireless communication device can include at least one processor and at least one memory communicatively coupled with the at least one processor. In some implementations, the at least one memory stores processor-readable code that, when executed by the at least one processor, is configured to select one or more other APs for participation with the first AP in a coordinated access point transmission session on a wireless medium, the one or more selected APs associated with other respective BSSs that are different than the first BSS. Execution of the processor-readable code may also be configured to obtain a TXOP on the wireless medium, and to transmit a frame indicating scheduling information for UL or DL transmissions to or from each of the selected APs during at least a portion of the TXOP obtained by the first AP, the scheduling information indicating a respective start time for the respective UL or DL transmissions to or from each of the selected APs during at least the portion of the TXOP obtained by the first AP, at least two of the start times being offset from one another by a time period associated with decoding a preamble of a wireless packet. Execution of the processor-readable code may be configured to transmit or receive one or more wireless packets to or from one or more STAs associated with the first AP at least partially concurrently with the transmission or reception of one or more respective wireless packets by each of the selected APs to or from one or more respective STAs associated with the respective AP based on the scheduling information.

In various implementations, the respective start times of the UL or DL transmissions to or from the selected APs are based at least in part on one or both of signal strengths of wireless packets received by the first AP from the selected APs or levels of interference associated with the selected APs. In some instances, the respective start times of the UL or DL transmissions to or from at least some of the selected APs are the same as one another based at least in part on the respective signal strengths or levels of interference associated with the at least some selected APs being less than a value. In some other instances, the respective start times of the UL or DL transmissions to or from the at least two selected APs are offset from one another by the time period based at least in part on the respective signal strengths or levels of interference associated with the at least two selected APs being greater than a value.

In some implementations, the scheduling information may also indicate one or more of a respective MCS to be used for the UL or DL transmissions to or from each of the selected APs, a respective transmit power level to be used for the UL or DL transmissions to or from each of the selected APs, or a respective duration of the UL or DL transmissions to or from each of the selected APs. In some instances, the respective durations of the UL or DL transmissions to or from the selected APs may be the same. In other instances, the respective durations of the UL or DL transmissions to or from the selected APs may be different from one another by a second time period. In some aspects, the second time period may be associated with decoding a preamble of an ACK frame or a BA frame.

In other implementations, the frame may also indicate a respective duration of ACK frames or BA frames to be sent by the one or more STAs associated with a respective AP of the selected APs. In some instances, the respective durations of the ACK frames or BA frames may be the same as one another. In other instances, the respective durations of the ACK frames or BA frames may be offset in time from one another.

In various implementations, execution of the processor-readable code for selecting the one or more APs may be configured to transmit a poll frame to a plurality of APs associated with BSSs different than the first BSS. Execution of the processor-readable code may also be configured to receive a request, from one or more of the plurality of APs responsive to the poll frame, for the first AP to share a portion of the obtained TXOP with the respective AP. Execution of the processor-readable code may also be configured to select the one or more APs for participation in the coordinated access point transmission session based on the received requests. In some implementations, execution of the processor-readable code may be further configured to selectively adjust a length or duration of each of the one or more wireless packets transmitted to or received from the one or more STAs associated with the first AP based at least in part on one or more of the respective signal strengths of wireless packets received by the first AP from the selected APs, the respective levels of interference associated with the selected APs, or respective decoding error rates of the first AP and the selected APs. In some instances, the frame includes instructions for each of the selected APs to transmit the scheduling information to the one or more respective STAs associated with the respective selected AP. In some aspects, the scheduling information is transmitted to the one or more STAs associated with the first AP as a respective plurality of non-HT duplicates over a corresponding plurality of subchannels of the wireless medium.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
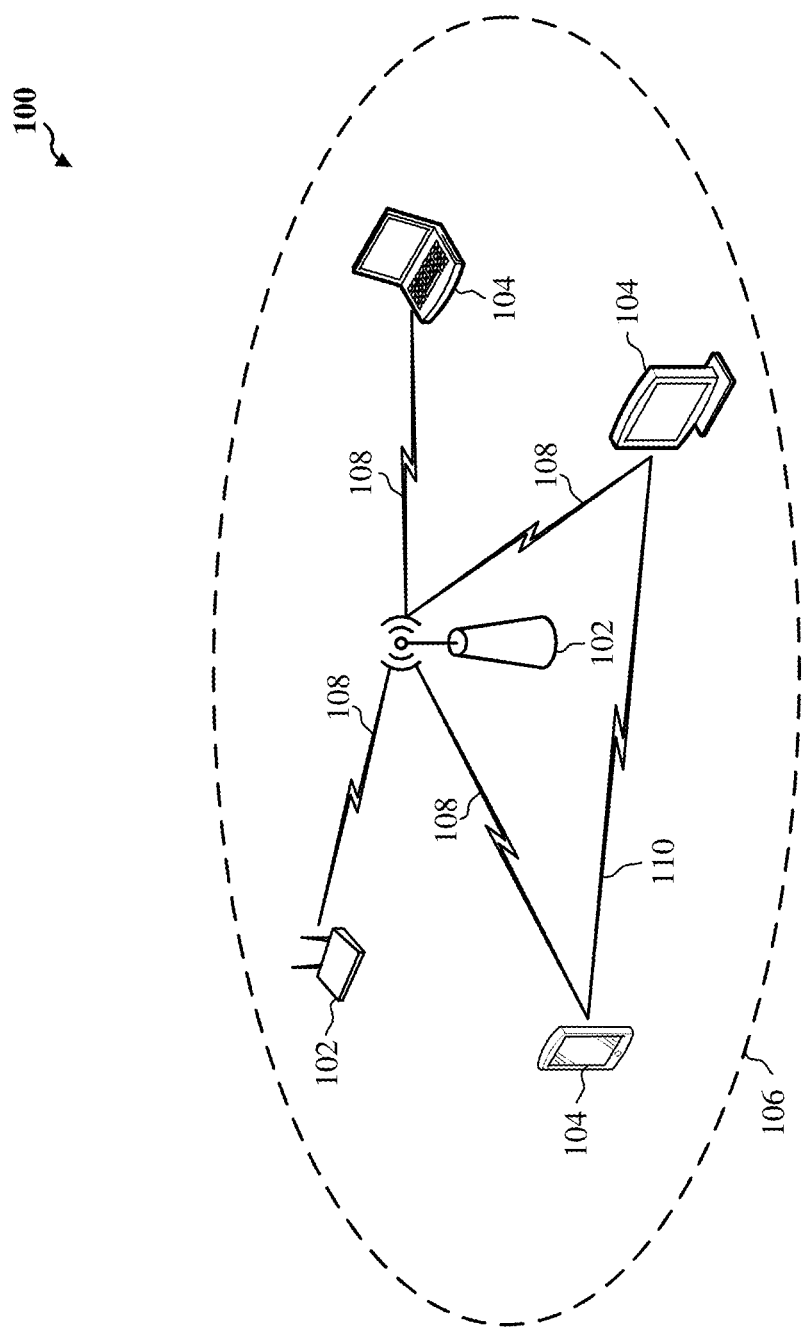
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Various implementations relate generally to sharing resources of a wireless medium with a group of wireless communication devices, irrespective of which wireless communication device is the owner of a transmission opportunity (TXOP) on the wireless medium. Some implementations more specifically relate to a first access point (AP) that manages a first basic service set (BSS) sharing some or all of a TXOP obtained on the wireless medium with other APs associated with other, overlapping BSSs (OBSSs) that operate independently of the first BSS. In some implementations, the first AP may select one or more of the other APs to participate with the first AP in a coordinated access point transmission session during which the first AP shares at least a portion of a TXOP with the one or more selected APs for uplink (UL) transmissions to, or downlink (DL) transmissions from, the selected APs. In some examples, the first AP may request or obtain information indicating whether or not the other APs intend to participate in the coordinated access point transmission session, and if so, amounts of wireless resources requested to be shared by the first AP. The first AP may use the obtained information to determine or select which of the other APs to admit as participants in the coordinated access point transmission session. After obtaining the TXOP on the wireless medium, the first AP may transmit, to the one or more selected APs, a frame indicating scheduling information for UL transmissions to or DL transmissions from each of the selected APs during a specified portion of the TXOP obtained by the first AP. The scheduling information may be based at least in part on one or more of respective signal strengths of wireless packets received from the selected APs, respective levels of interference associated with the selected APs, respective decoding error rates of the first AP and the selected APs, or wireless resources requested by the selected APs.

During the coordinated access point transmission session, the first AP may transmit or receive one or more wireless packets to or from one or more STAs associated with the first AP at least partially concurrently with the transmission or reception of one or more respective wireless packets by the selected APs to or from one or more respective STAs associated with the respective AP based on the scheduling information. In some implementations, the scheduling information indicates a respective start time for the UL or DL transmissions to or from each of the selected APs during at least the portion of the TXOP obtained by the first AP. In some instances, the respective start times may be the same as one another. In other instances, the respective start times may be offset from one another by the time period. In some aspects, the time period may be based on an amount of time associated with the participating APs decoding a preamble of a wireless packet and determining, from the decoded preamble, whether the wireless packet is an intra-BSS packet or is an OBSS packet.

Particular implementations of the subject matter described in this disclosure can be implemented to realize one or more of the following potential advantages. By allowing a group of APs associated with different BSSs to participate in a coordinated access point transmission session during which the group of APs may share at least a portion of a TXOP obtained by any one of the participating APs, aspects of the present disclosure may increase throughput of the wireless medium across all of the BSSs associated with the participating APs. Also, by scheduling UL transmissions to or DL transmissions from the participating APs at start times that can be the same as one another or that can be offset from one another by a time period, aspects of the present disclosure may maximize medium utilization while also minimizing packet loss resulting from OBSS interference. For example, when the signal strengths or levels of interference associated with the selected APs are relatively low (such as less than a value), or when the decoding error rates of the participating APs are relatively low (such as less than a threshold), the start times may be the same as one another. In this way, aspects of the present disclosure may align the UL transmissions to or DL transmissions from the participating APs with one another in a manner that maximizes medium utilization. In addition, aligning the UL transmissions to or DL transmissions from the participating APs may allow corresponding UL data or DL data to be transmitted using multi-user (MU) multiple-input multiple-output (MIMO) transmission techniques.

Conversely, when the signal strengths or levels of interference associated with the selected APs are relatively high (such as greater than the value), or when the decoding error rates of the participating APs are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP (or its associated STAs) to decode the preamble of the wireless packet and obtain the BSS color value carried in the wireless packet to determine whether the wireless packet is an intra-BSS packet or an OBSS packet. In this way, aspects of the present disclosure may ensure that each of the participating APs, and their associated STAs, are able to receive and decode intra-BSS packets in the presence of OBSS interference.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P)

networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
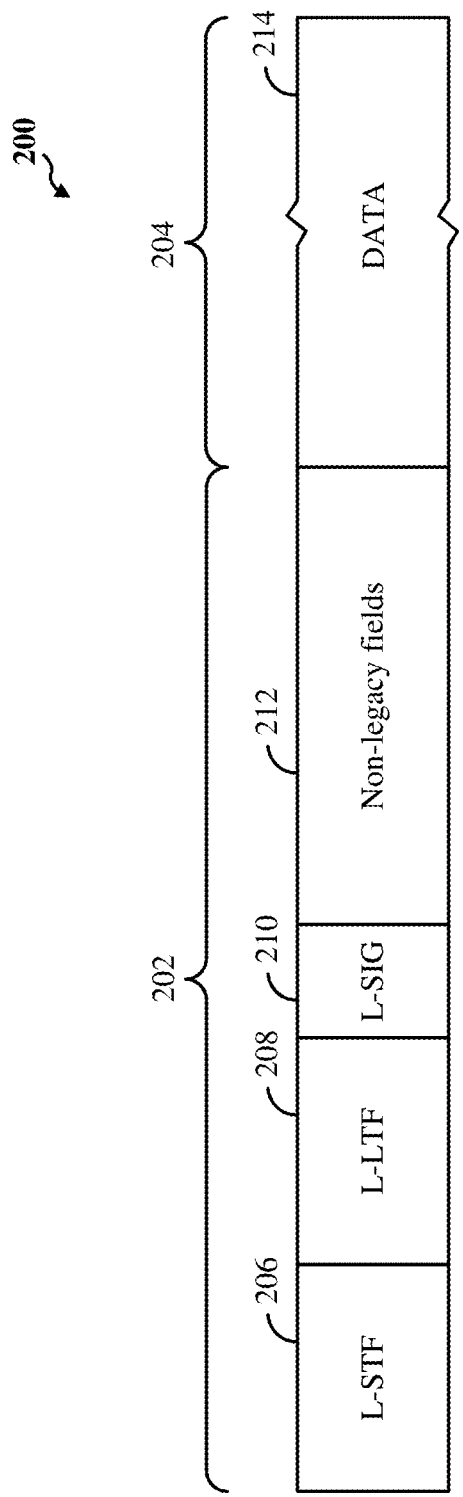
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 also may include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
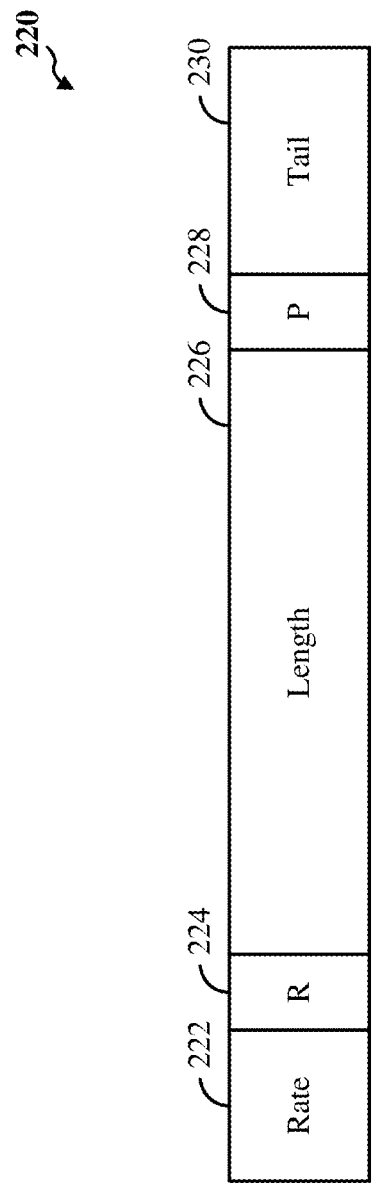
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3A:
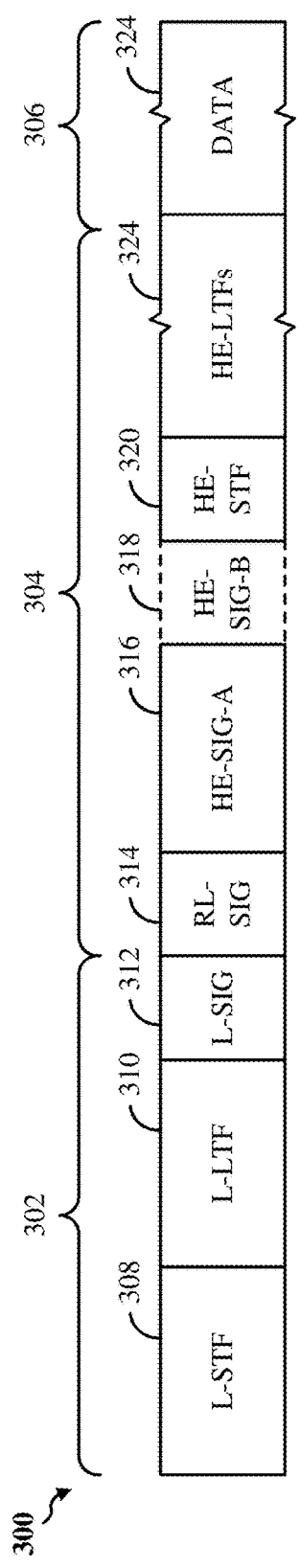
FIG. 3A shows another example PDU usable for communications between an AP and one or more STAs.

FIG. 3A shows another example PDU 300 usable for wireless communication between an AP and one or more STAs. The PDU 300 may be used for SU, OFDMA or MU-MIMO transmissions. The PDU 300 may be formatted as a High Efficiency (HE) WLAN PPDU in accordance with the IEEE 802.11ax amendment to the IEEE 802.11 wireless communication protocol standard. The PDU 300 includes a PHY preamble including a legacy portion 302 and a non-legacy portion 304. The PDU 300 may further include a payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the non-legacy portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-B 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
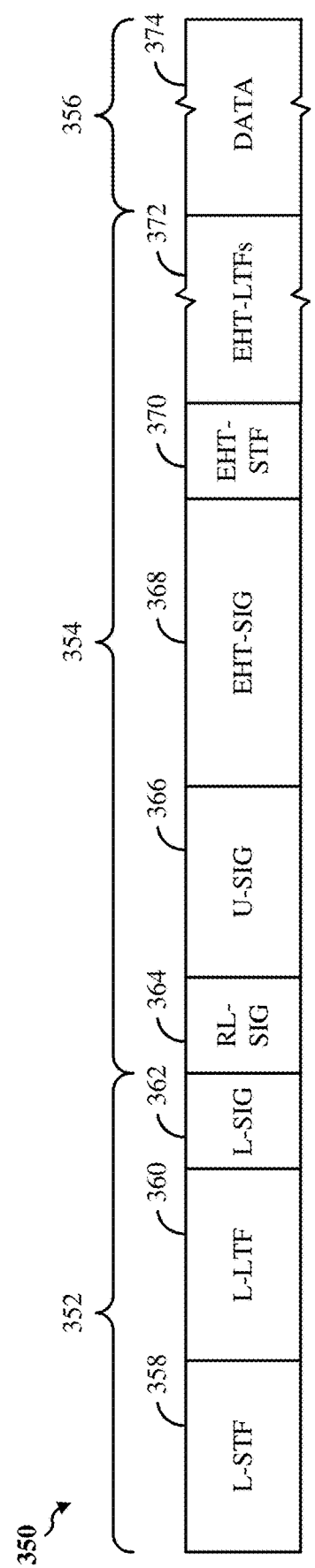
FIG. 3B shows another example PDU usable for communications between an AP and one or more STAs.

FIG. 3B shows another example PPDU 350 usable for wireless communication between an AP and one or more STAs. The PDU 350 may be used for SU, OFDMA or MU-MIMO transmissions. The PDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PDU 350 includes a PHY preamble including a legacy portion 352 and a non-legacy portion 354. The PDU 350 may further include a PHY payload 356 after the preamble, for example, in the form of a PSDU including a data field 376.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 372 (referred to herein as "EHT-STF 372," although it may be structured as, and carry version-dependent information for, other wireless communication protocol versions beyond EHT) and one or more additional long training fields 374 (referred to herein as "EHT-LTFs 374," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 376. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 376. In the context of DL MU-OFDMA, such information enables the respective STAs 104 to identify and decode corresponding RUs in the associated data field 376. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 376.

Figure 4:
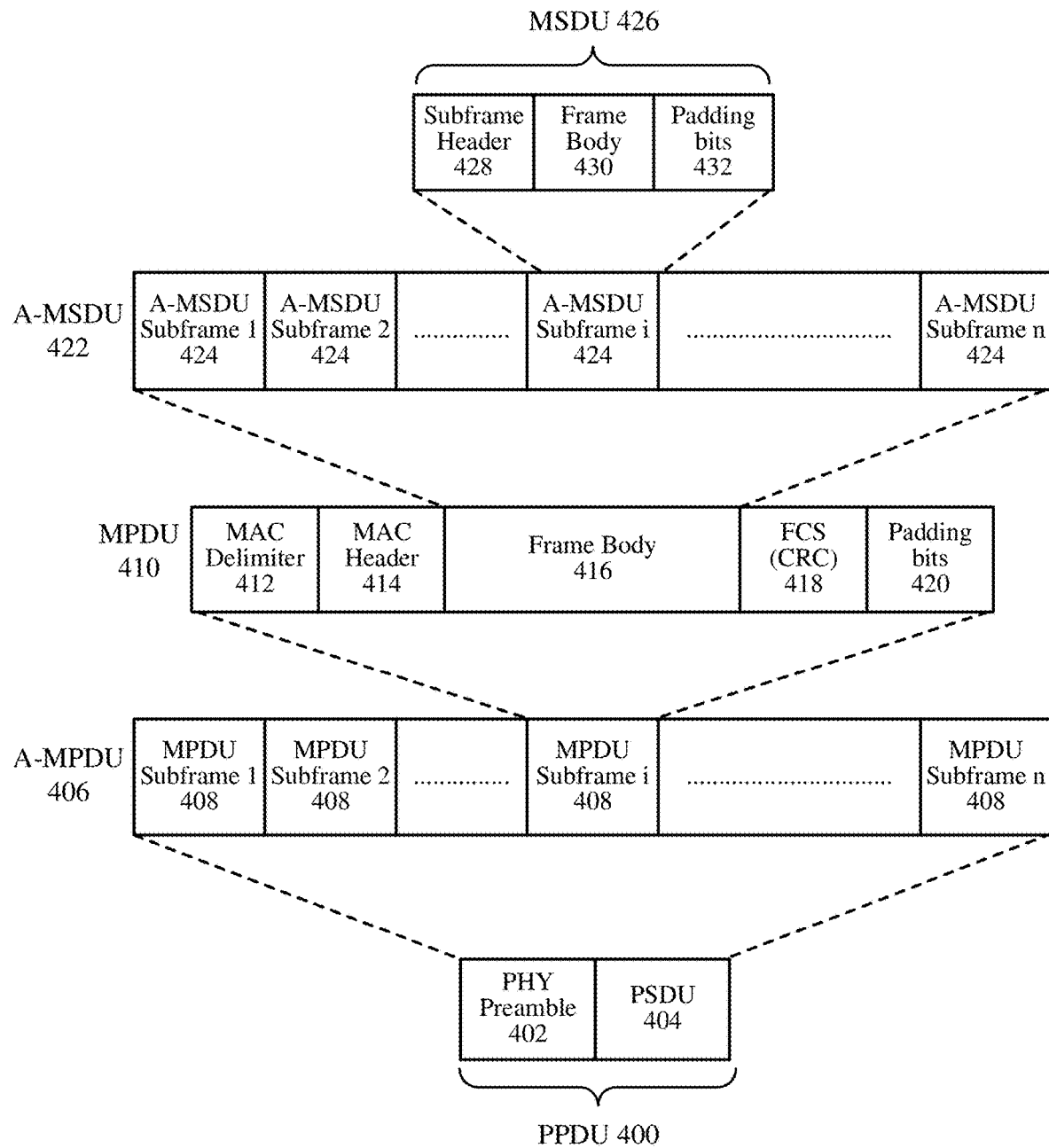
FIG. 4 shows an example physical layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs), for example, such as an aggregated MPDU (A-MPDU) 406 that includes multiple MPDU subframes 408. Each MPDU subframe 408 may include a MAC delimiter 412 and a MAC header 414 prior to the accompanying frame body 416, which includes the data portion or "payload" of the MPDU subframe 408. The frame body 416 may carry one or more MAC service data units (MSDUs), for example, such as an aggregated MSDU (A-MSDU) 422 that includes multiple MSDU subframes 424. Each MSDU subframe 424 contains a corresponding MSDU 426 including a subframe header 428, a frame body 430, and one or more padding bits 432.

Referring back to the A-MPDU subframe 406, the MAC header 414 may include a number of fields containing information that defines or indicates characteristics or attributes of data encapsulated within the frame body 416. The MAC header 414 also includes a number of fields indicating addresses for the data encapsulated within the frame body 416. For example, the MAC header 414 may include a combination of a source address, a transmitter address, a receiver address, or a destination address. The MAC header 414 may include a frame control field containing control information. The frame control field specifies the frame type, for example, a data frame, a control frame, or a management frame. The MAC header 414 may further include a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 408 may also include a frame check sequence (FCS) field 418 for error detection. For example, the FCS field 418 may include a cyclic redundancy check (CRC), and may be followed by one or more padding bits 420.

As described above, APs 102 and STAs 104 can support multi-user (MU) communications. That is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
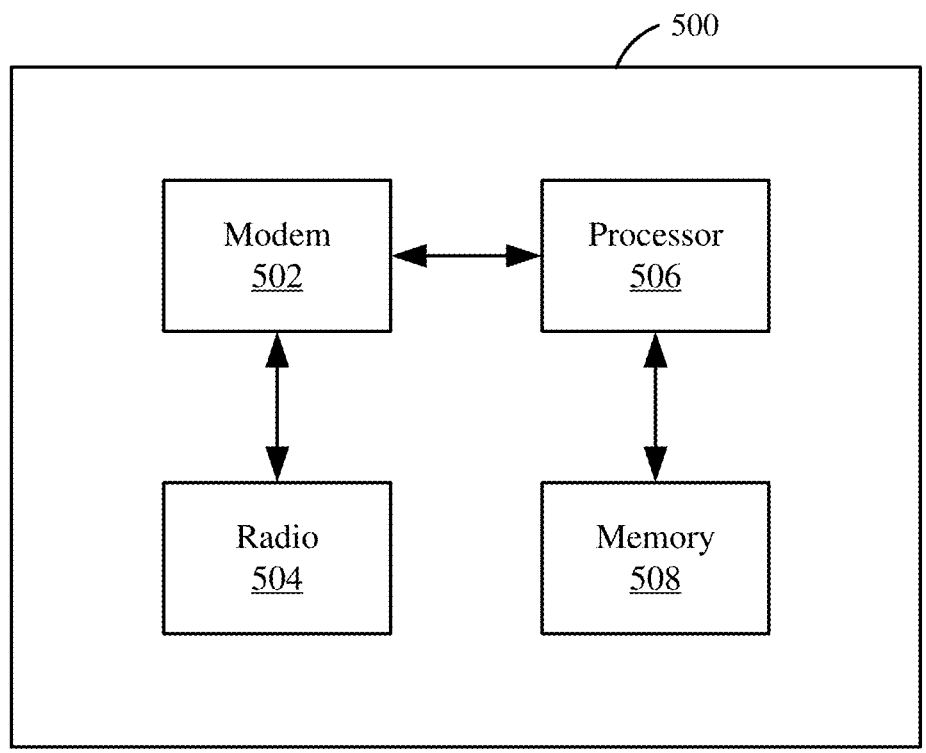
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device 500 can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 500 can be, or can include, a chip, system on chip (SoC), chipset, package, or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 500 further includes one or more processors, processing blocks or processing elements (collectively "the processor 506"), and one or more memory blocks or elements (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer, and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number Nss of spatial streams or a number NsTs of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation, or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 508 can include tangible storage media such as random-access memory (RAM) or read-only memory (ROM), or combinations thereof. The memory 508 also can store non-transitory processor- or computer-executable software (SW) code containing instructions that, when executed by the processor 506, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 6B:
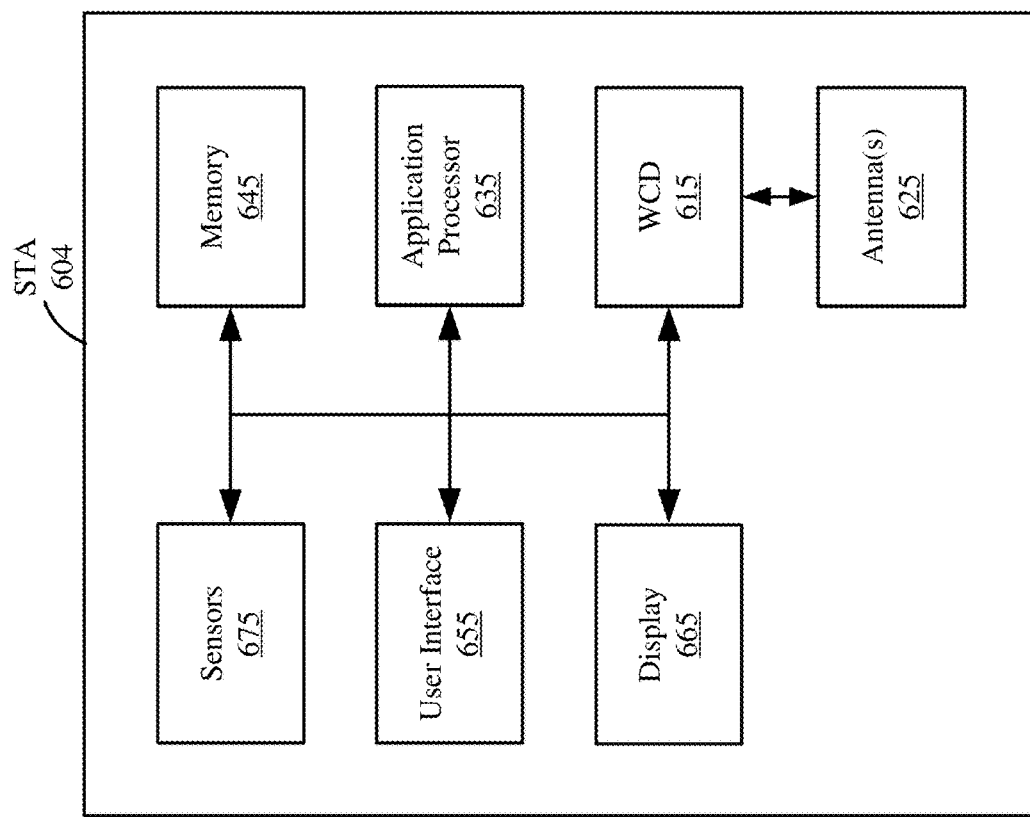
FIG. 6B shows a block diagram of an example station (STA).
Figure 6A:
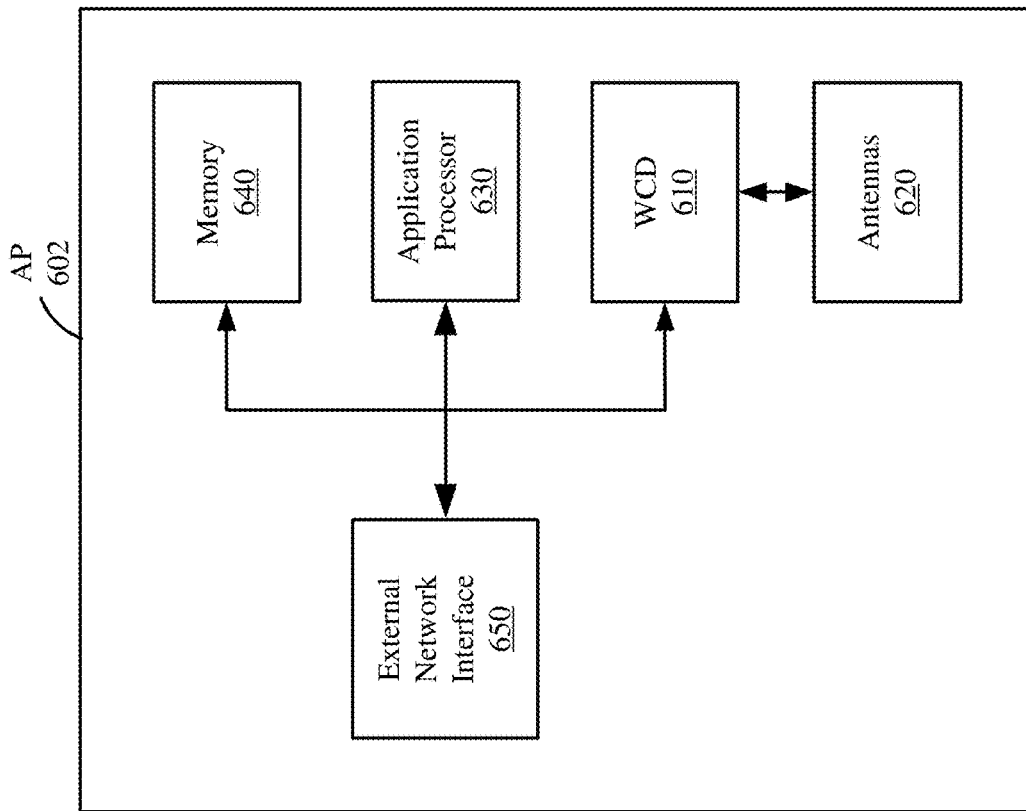
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

As mentioned above, various implementations relate generally to sharing resources of a wireless medium with a group of wireless communication devices, irrespective of which wireless communication device is the owner of a TXOP on the wireless medium. Some implementations more specifically relate to a first AP associated with a first BSS sharing some or all of a TXOP obtained on the wireless medium with other APs associated with OBSSs that operate independently of the first BSS. In some implementations, the first AP may select one or more of the other APs to participate in a coordinated access point transmission session during which the first AP shares at least a portion of a TXOP with the one or more selected APs for UL transmissions to or DL transmissions from the participating APs. After obtaining the TXOP on the wireless medium, the first AP may transmit, to the one or more selected APs, a frame indicating scheduling information for UL transmissions to or DL transmissions from each of the selected APs during a specified portion of the TXOP obtained by the first AP. The scheduling information may be based on one or more of signal strengths of wireless packets received from the selected APs, levels of interference associated with the selected APs, decoding error rates of the first AP and the selected APs, or wireless resources requested by the selected APs.

During the coordinated access point transmission session, the first AP may transmit or receive one or more wireless packets to or from one or more STAs associated with the first AP at least partially concurrently with the transmission or reception of one or more wireless packets by the selected APs to or from one or more STAs associated with the respective selected APs based on the scheduling information. In some implementations, the scheduling information indicates a start time for the UL or DL transmissions to or from each of the selected APs during at least the portion of the TXOP obtained by the first AP. In some instances, the start times may be the same as one another. In other instances, the start times may be offset from one another by a time period. In some aspects, the time period may be based on an amount of time associated with the participating APs decoding a preamble of a wireless packet and determining, from the decoded preamble, whether the wireless packet is an intra-BSS packet or is an OBSS packet.

Particular implementations of the subject matter described in this disclosure can be implemented to realize one or more of the following potential advantages. By allowing a group of APs associated with or associated with different BSSs to participate in a coordinated access point transmission session during which the group of APs may share at least a portion of a TXOP obtained by any one of the participating APs, aspects of the present disclosure may increase throughput of the wireless medium across all of the BSSs associated with the participating APs. Also, by scheduling UL transmissions to or DL transmissions from the participating APs at start times that can be the same as one another or that can be offset from one another by a time period, aspects of the present disclosure may maximize medium utilization while also minimizing packet loss resulting from OBSS interference. For example, when the signal strengths or levels of interference associated with the selected APs are relatively low (such as less than a value), or when the decoding error rates of the participating APs are relatively low (such as less than a threshold), the start times may be the same as one another. In this way, aspects of the present disclosure may align the UL transmissions to or DL transmissions from the participating APs with one another in a manner that maximizes medium utilization. In addition, aligning the UL transmissions to or DL transmissions from the participating APs may allow corresponding UL data or DL data to be transmitted using multi-user (MU) multiple-input multiple-output (MIMO) transmission techniques.

Conversely, when the signal strengths or levels of interference associated with the selected APs are relatively high (such as greater than the value), or when the decoding error rates of the participating APs are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP (or its associated STAs) to decode the preamble of the wireless packet and obtain the BSS color value carried in the wireless packet to determine whether the wireless packet is an intra-BSS packet or an OBSS packet. In this way, aspects of the present disclosure may ensure that each of the participating APs, and their associated STAs, are able to receive and decode intra-BSS packets in the presence of OBSS transmissions associated with the other participating APs.

Figure 7A:
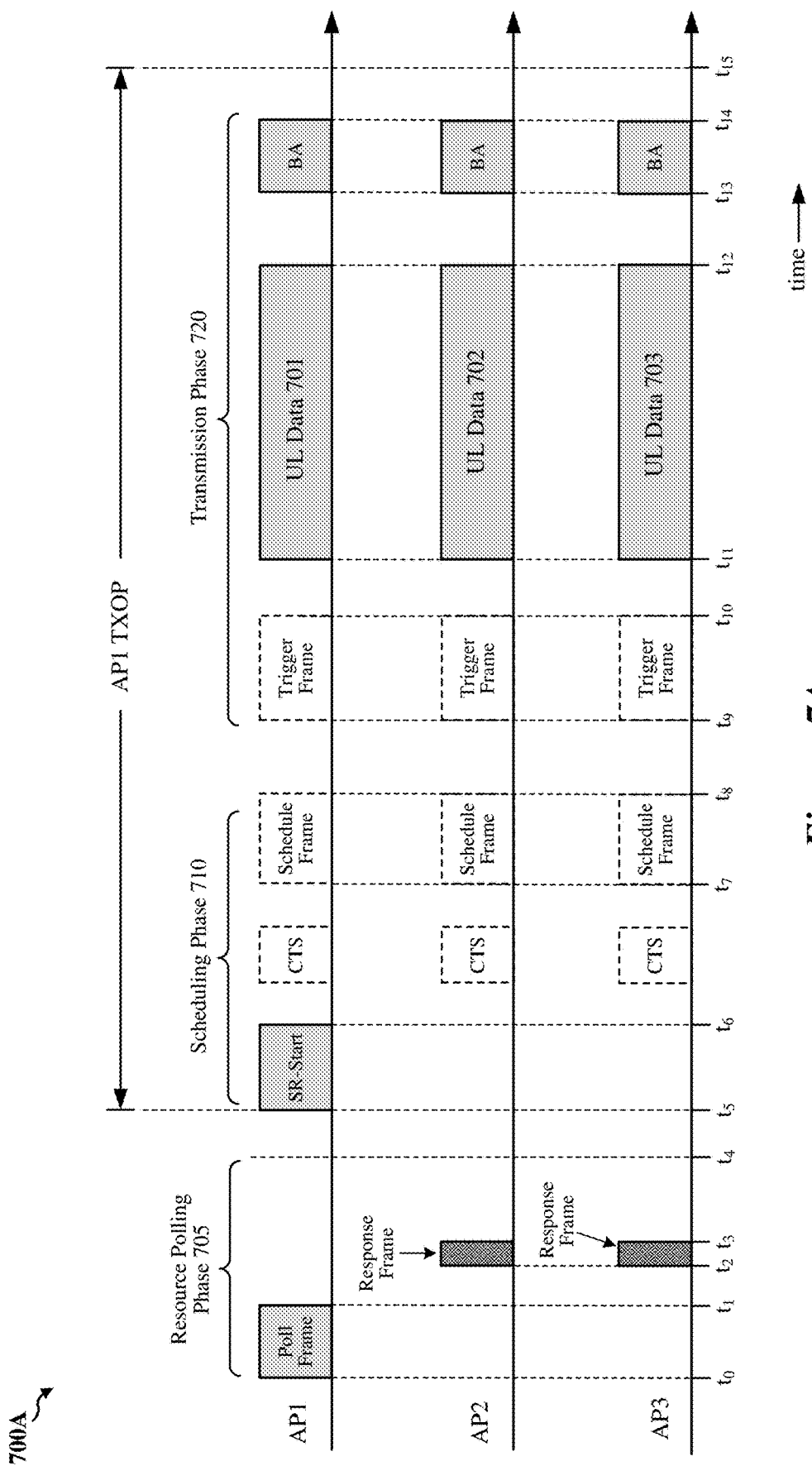
FIG. 7A shows a timing diagram of an example wireless communication that supports coordinated spatial reuse for uplink (UL) transmissions according to some implementations.

FIG. 7A shows a timing diagram of an example wireless communication 700A that supports coordinated spatial reuse for UL transmissions according to some implementations. The wireless communication 700A is shown to include a first AP (AP1), a second AP (AP2), and a third AP (AP3). Each of AP1, AP2, and AP3 may be any suitable access point, access terminal, or a peer-to-peer (P2P) device such as softAP that can operate a basic service set (BSS) on a wireless medium. In some implementations, each of AP1, AP2, and AP3 may be one implementation of the AP 102 of FIG. 1 or the AP 602 of FIG. 6A. In some instances, AP1 may belong to or associated with a first BSS, AP2 may belong to or associated with a second BSS, and AP3 may belong to or associated with a third BSS, where the first BSS, the second BSS, and the third BSS are different than one another. Although not shown in FIG. 7 for simplicity, one or more wireless stations (STA) may be associated with each of AP1, AP2, and AP3.

In some implementations, AP1, AP2, and AP3 may be located near one another such that their wireless coverage areas at least partially overlap one another. For example, in some instances, AP1, AP2, and AP3 may operate independent BSSs within the same home, the same company, the same building, and so on, and may benefit from sharing wireless resources with each other in a coordinated manner. In some aspects, AP1, AP2, and AP3 may be associated with the same entity or controlled by the same administrator. In some implementations, AP1, AP2, and AP3 may be connected to one another by a backhaul connection over which capabilities, resource allocations, scheduling information, and other data can be exchanged between AP1, AP2, and AP3. When the wireless coverage areas of AP1, AP2, and AP3 overlap one another, or are within a threshold distance of each other, wireless transmissions associated with one of the BSSs may interfere with wireless transmissions associated with the other BSSs. As such, the BSSs operated by AP1, AP2, and AP3 may be OBSSs.

The coordinated access point transmission session depicted by the wireless communication 700A of FIG. 7A may include a resource polling phase 705, a scheduling phase 710, and a transmission phase 720. The resource polling phase 705 may be used to identify nearby APs and select one or more of the identified APs to participate in the coordinated access point transmission session. The scheduling phase 710 may be used to allocate wireless resources to the selected APs, and to determine or obtain scheduling information for UL transmissions to the selected APs during the coordinated access point transmission session. The transmission phase 720 may be used to share portions of the TXOP obtained by AP1 with the selected APs, for example, so that each of the APs can receive UL transmissions from their associated STAs during the coordinated access point transmission session.

In some implementations, the resource polling phase 705 may begin at time to with AP1 transmitting a poll frame over the wireless medium to nearby APs such as AP2 and AP3. The poll frame, which may be any suitable poll frame, action frame, control frame, or management frame, may advertise or otherwise indicate the existence of the coordinated access point transmission session on the wireless medium. In some instances, the poll frame may request each receiving AP to indicate whether or not the receiving AP intends to participate in the coordinated access point transmission session. The poll frame may also solicit a request for wireless resources from each of the receiving APs.

One or more of the receiving APs (such as AP2 and AP3) receive the poll frame, and determine whether or not to participate in the coordinated access point transmission session. In the example of FIG. 7A, AP2 and AP3 signal their intent to participate in the coordinated access point transmission session by transmitting response frames over the wireless medium to AP1 between times $t_2$ and $t_3$. The response frames may indicate the operating capabilities of AP2 and AP3, and may include a request for wireless resources for UL transmissions during the coordinated access point transmission session. In some instances, the response frame may request an allocation of time and frequency resources to the respective AP. In other instances, the response frame may request AP1 to share a particular portion or duration of a TXOP obtained by AP1 with the respective AP.

AP1 receives the response frames sent by AP2 and AP3, and may use information carried in the response frames to determine or select which of the APs to admit as participants of the coordinated access point transmission session. AP1 may also use the information carried in the response frames to allocate time and frequency resources to the participating APs, to determine or select a portion of the TXOP to share with the participating APs, and to determine or obtain scheduling information for UL transmissions to the participating APs. In the example of FIG. 7A, the resource polling phase 705 ends at time $t_4$.

Between times $t_4$ and $t_5$, AP1 obtains a TXOP on the wireless medium. In some implementations, AP1 may sense that the wireless medium is idle for a period of time based on a channel sensing operation (such as clear channel assessment (CCA)) before contending for channel access. In some instances, AP1 may sense that the wireless medium is idle for a PIFS duration before attempting to gain channel access. In some other instances, AP1 may sense that the wireless medium is idle for a DIFS duration before attempting to gain channel access.

In some implementations, the scheduling phase 710 may begin at time $t_5$ with AP1 transmitting a Spatial Reuse (SR) Start frame over the wireless medium to AP2 and AP3. The SR Start frame may identify AP2 and AP3, may indicate an allocation of wireless resources to the second and third BSSs (operated by AP2 and AP3, respectively) during the coordinated access point transmission session, and may include scheduling information for UL transmissions to AP2 and AP3 during the coordinated access point transmission session. In some aspects, the SR Start frame may also include instructions for AP2 and AP3 to re-transmit the scheduling information and resource allocations indicated in the SR Start frame to their associated STAs in one or more schedule frames. In some instances, the scheduling information may indicate a start time for UL transmissions to each of the participating APs. In some other instances, the scheduling information may also indicate one or more of an MCS to be used for UL transmissions to the participating APs, a transmit power level to be used for UL transmissions to the participating APs, or a duration of UL transmissions to the participating APs. In some other instances, the scheduling information may also indicate the transmission power limit and/or the tolerable interference level for each of the participating APs.

AP2 and AP3 receive the SR Start frame, and may decode the SR Start frame to obtain the scheduling information and resource allocations provided by AP1. In some instances, each of AP2 and AP3 may transmit a clear-to-send (CTS) frame over the wireless medium to acknowledge reception of the SR Start frame and to reserve the wireless medium. In other instances, AP2 and AP3 may not transmit frames responsive to the SR Start frame.

In some instances, at time $t_7$, AP1, AP2, and AP3 may transmit a schedule frame over the wireless medium to their associated STAs. The schedule frames may include the same information that is carried in the SR Start frame such as (but not limited to) the scheduling information and resource allocations, for example, to ensure that all of the STAs associated with AP2 and AP3 obtain the scheduling information and resource allocations prior to the start of the transmission phase 720. For example, although AP2 and AP3 may be within wireless range of AP1 and able to receive and decode the SR Start frame, some of the STAs associated with AP2 or AP3 (or both) may not be within wireless range of AP1, and therefore may not be able to receive or decode the SR Start frame transmitted by AP1. In this way, STAs associated with AP2 may obtain the resource allocations and scheduling information from the schedule frame transmitted by AP2, and STAs associated with AP3 may obtain the resource allocations and scheduling information from the schedule frame transmitted by AP3.

In some implementations, the schedule frames may be identical to each other and carry the same information as the SR Start frame. For example, the schedule frames may have the same format and the same transmit duration as one another, may be transmitted using the same MCS as one another, and so on. In this way, the transmission of a schedule frame from a respective AP may have minimal, if any, impact on the transmission of schedule frames from other APs participating in the coordinated access point transmission session.

In some instances, the schedule frames may be transmitted over the wireless medium as a plurality of identical non-HT duplicate PPDUs. For example, a schedule frame may be formatted for transmission over a 20 MHz subchannel, duplicated a number N of instances, and transmitted as N duplicates over an N×20 MHz bandwidth (where N is an integer greater than 1). In other aspects, the schedule frame may be formatted for transmission over a wider subchannel (such as a 40 MHz or 80 MHz subchannel). The concurrent transmission of non-HT duplicates carrying the same scheduling information and the same resource allocations over a plurality of different subchannels may allow STAs associated with the participating APs to receive the schedule frame and obtain the scheduling information and the resource allocations carried therein, regardless of the particular subchannel on which the associated STAs may operate. The STAs associated with AP1, AP2, and AP3 receive the schedule frames between times $t_8$ and $t_9$, and obtain the scheduling information and resource allocations indicated in the SR Start frame.

In some other instances, AP1, AP2, and AP3 may not transmit the schedule frames, for example, when the STAs associated with AP2 and AP3 are able to obtain the scheduling information and resource allocations provided by AP1 from the SR-Start frame. In such instances, the transmission phase 720 may begin at time $t_7$ (rather than at time $t_9$ as depicted in the example of FIG. 7A).

In some implementations, the transmission phase 720 may begin at time $t_9$ with AP1 transmitting a trigger frame over the wireless medium to AP2 and AP3, between times $t_9$ and $t_{10}$. The trigger frame may identify AP2 and AP3, and may allocate time and frequency resources to the respective BSSs operated by AP2 and AP3 for UL transmissions from one or more STAs associated with the respective BSSs. The trigger frame may be any suitable trigger frame including (but not limited to) a basic trigger frame or an MU-RTS trigger frame. In some instances, AP2 may transmit a trigger frame over the wireless medium to its associated STAs at time $t_9$, and AP3 may transmit a trigger frame over the wireless medium to its associated STAs at time $t_9$. The trigger frame transmitted by AP2 may include the scheduling information and resource allocations for STAs associated with AP2, and the trigger frame transmitted by AP3 may include the scheduling information and resource allocations for STAs associated with AP3. In some other implementations, AP1, AP2, and AP3 may not transmit a trigger frame, and the transmission phase 720 may begin with transmissions of UL data 701, 702, and 703 to AP1, AP2, and AP3, respectively.

Between times $t_{11}$ and $t_{12}$, one or more STAs associated with the first BSS transmit UL data 701 over the wireless medium to AP1, one or more STAs associated with the second BSS transmit UL data 702 over the wireless medium to AP2, and one or more STAs associated with the third BSS transmit UL data 703 over the wireless medium to AP3. In some instances, the UL data transmissions to AP1, AP2, and AP3 may begin at the same time (such as by having the same start times). In other instances, the UL data transmissions to AP1, AP2, and AP3 may be offset from each other by a time period. In some aspects, the time period may be based on an amount of time associated with determining whether a wireless packet detected on the wireless medium is an intra-BSS packet or an OBSS packet.

Each of AP1, AP2, and AP3 receives the UL transmissions from their respective associated STAs, and may indicate their successful reception by transmitting acknowledgements to their respective associated STAs, at time $t_{13}$. The acknowledgements may be acknowledgement (ACK) frames, block acknowledgement (BA) frames, or some other suitable frame. The acknowledgements are shown in FIG. 7A as BA frames for illustrative purposes only.

The STAs associated with the first, second, and third BSSs receive the BA frames from AP1, AP2, and AP3, respectively, between times $t_{13}$ and $t_{14}$. In some instances, the transmission phase 720 ends at time $t_{14}$, and the TXOP obtained by AP1 ends at time tis. In other instances, the TXOP obtained by AP1 may extend beyond time tis, and the transmission phase 720 may extend beyond time $t_{14}$.

Figure 7B:
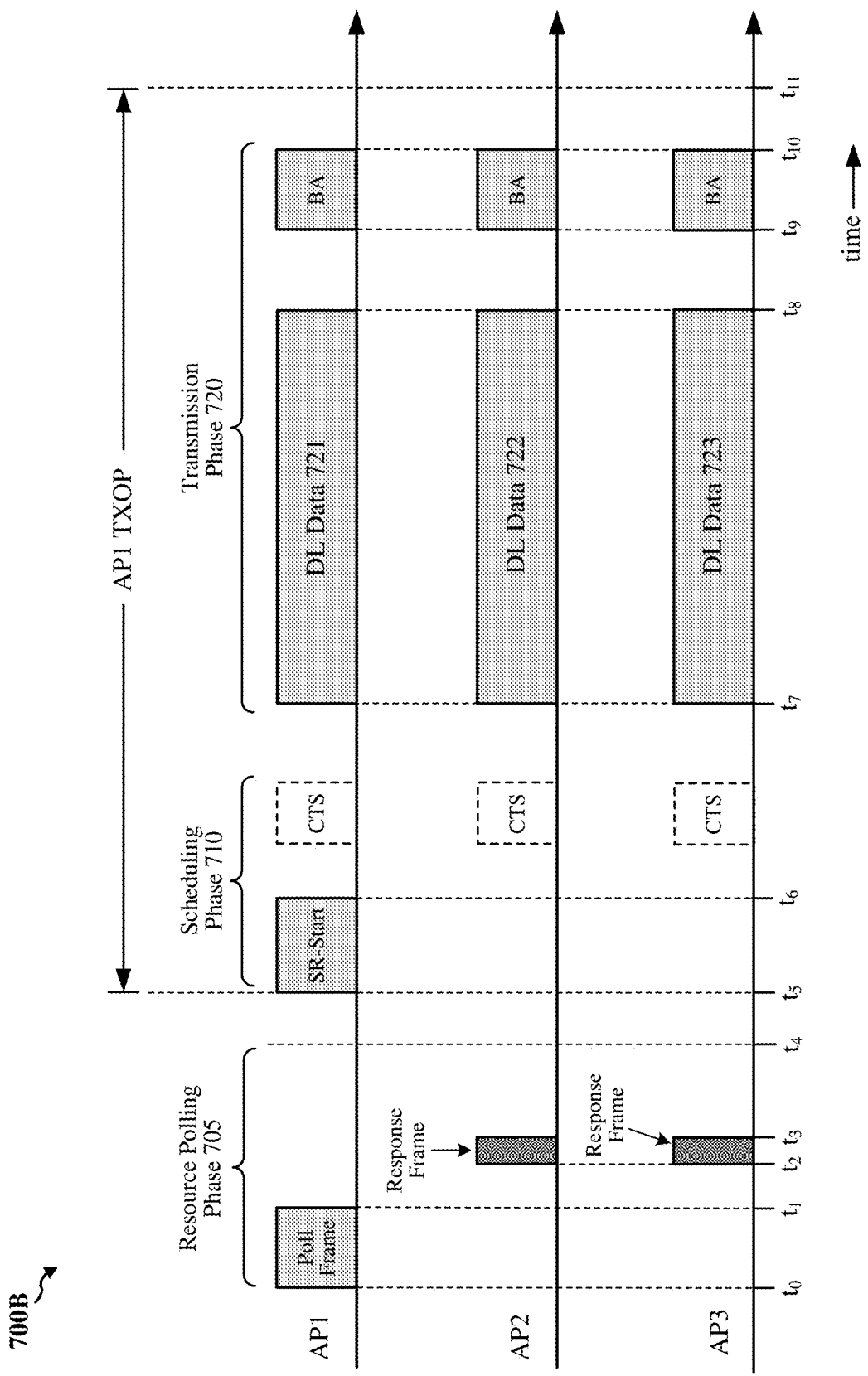
FIG. 7B shows a timing diagram of an example wireless communication that supports coordinated spatial reuse for downlink (DL) transmissions according to some other implementations.

FIG. 7B shows a timing diagram of an example wireless communication 700B that supports coordinated spatial reuse for DL transmissions according to some implementations. The wireless communication 700B is shown to include AP1, AP2, and AP3 described with reference to FIG. 7A. The wireless communication 700B is similar to the wireless communication 700A of FIG. 7A, except that the coordinated access point transmission session depicted in FIG. 7B is designated for DL transmissions from AP1, AP2, and AP3. In some instances, the resource polling phase 705 and scheduling phase 710 shown in the example wireless communication 700B are similar to the polling phase 705 and scheduling phase 710, respectively, described with reference to FIG. 7A.

The transmission phase 720 may begin at time $t_7$ with AP1 transmitting DL data 721 to one or more STAs associated with the first BSS, AP2 transmitting DL data 722 to one or more STAs associated with the second BSS, and AP3 transmitting DL data 723 to one or more STAs associated with the third BSS. In some instances, the DL data transmissions from AP1, AP2, and AP3 may start at the same time, as shown in the example of FIG. 7B. In other instances, the DL data transmissions from AP1, AP2, and AP3 may be offset from each other by a time period. In some instances, the DL data transmissions from AP1, AP2, and AP3 may end concurrently, at time $t_8$, as shown in the example of FIG. 7B. In other instances, the DL data transmissions from AP1, AP2, and AP3 may end at different times.

Between times $t_7$ and $t_8$, the one or more STAs associated with the first BSS receive the DL data 721 from AP1, the one or more STAs associated with the second BSS receive the DL data 722 from AP2, and the one or more STAs associated with the third BSS receive the DL data 723 from AP3. At time $t_9$, the STAs associated with AP1, AP2, and AP3 may indicate successful reception of corresponding DL data 721, 722, and 723 by transmitting acknowledgements to their respective APs. The acknowledgements may be ACK frames, BA frames, or other suitable frames capable of indicating which portions of the DL data were successfully decoded by a respective STA, and which portions of the DL data were not received or not successfully decoded by the respective STA. The acknowledgements are shown in FIG. 7A as BA frames for illustrative purposes only.

AP1, AP2, and AP3 may receive the BA frames from their respective associated STAs between times $t_9$ and $t_{10}$. In some instances, the transmission phase 720 ends at time $t_{10}$, and the TXOP obtained by AP1 ends at time $t_{11}$. In other instances, the TXOP obtained by AP1 may extend beyond time $t_{11}$, and the transmission phase 720 may extend beyond time $t_{10}$.

Figure 8:
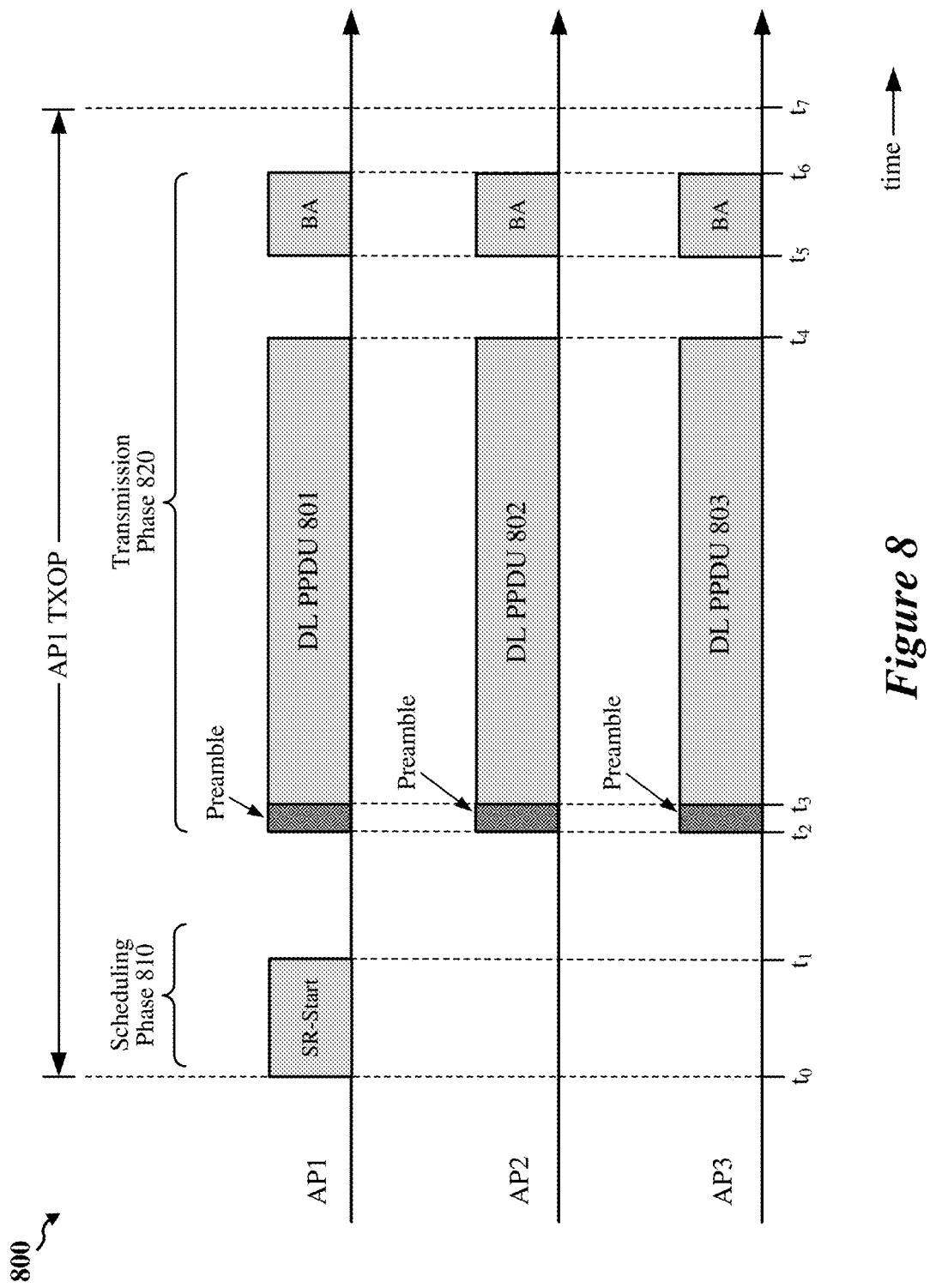
FIG. 8 shows a timing diagram of another example wireless communication that supports coordinated spatial reuse for DL transmissions according to some implementations.

FIG. 8 shows a timing diagram of another example wireless communication 800 that supports coordinated spatial reuse for DL transmissions according to some implementations. The wireless communication 800 is shown to include AP1, AP2, and AP3 described with reference to FIGS. 7A and 7B. In some implementations, the wireless communication 800 may be one example of the wireless communication 700B of FIG. 7B. For example, in some aspects, the resource polling phase (not shown for simplicity) and the scheduling phase 810 of the example of FIG. 8 are similar to the polling phase 705 and scheduling phase 710, respectively, described with reference to FIGS. 7A and 7B. In the example of FIG. 8, the scheduling information carried in the SR Start frame indicates that DL transmissions from AP1, AP2, and AP3 begin at the same time, and have the same transmit duration. As such, the DL transmissions from AP1, AP2, and AP3 may be temporally aligned with each other as they all have the same start time and the same end time.

The transmission phase 820 may begin at time $t_2$ with AP1 transmitting a DL PPDU 801 to one or more STAs associated with the first BSS between times $t_2$ and $t_4$, with AP2 transmitting a DL PPDU 802 to one or more STAs associated with the second BSS between times $t_2$ and $t_4$, and with AP3 transmitting a DL PPDU 803 to one or more STAs associated with the third BSS between times $t_2$ and $t_4$. Specifically, the concurrent transmissions of DL PPDUs 801, 802, and 803 have the same start time, the same transmit duration, and the same end time. Although the example of FIG. 8 shows AP1, AP2, and AP3 transmitting a single DL PPDU during the transmission phase 820 for simplicity, in some other implementations, each of AP1, AP2, and AP3 may transmit a plurality of DL PPDUs to their associated STAs during the transmission phase 820.

The one or more STAs associated with AP1 receive the DL PPDU 801, and indicate the successful reception of the DL PPDU 801 by transmitting acknowledgements to AP1 at time $t_5$. Similarly, the one or more STAs associated with AP2 indicate the successful reception of the DL PPDU 802 by transmitting acknowledgements to AP2 at time $t_5$, and the one or more STAs associated with AP3 indicate the successful reception of the DL PPDU 803 by transmitting acknowledgements to AP3 at time $t_5$. As discussed, the acknowledgements may be any suitable frame (such as ACK frames or BA frames) that can indicate which portions of a DL data transmission were successfully decoded by the respective STA, and which portions of the DL data transmission were not successfully decoded.

The acknowledgements sent by the one or more STAs associated with the first, second, and third BSSs, which are shown in FIG. 8 as BA frames for illustrative purposes only, may be received by AP1, AP2, and AP3 at time $t_6$. In some instances, the transmission phase 820 ends at time $t_6$, and the TXOP obtained by AP1 ends at time $t_7$. In other instances, the TXOP obtained by AP1 may extend beyond time $t_7$, and the transmission phase 820 may extend beyond time $t_6$.

As discussed, the transmissions of DL PPDUs 801-803 are temporally aligned with each other, and therefore may be suitable for transmission using MU-MIMO. The alignment of DL PPDUs 801-803 may also increase medium utilization and data throughput during the transmission phase 820. In some instances, the alignment of DL PPDUs 801-803 with each other may allow OBSS transmissions associated with the second BSS or the third BSS to interfere with the ability of STAs associated with AP1 to detect and successfully decode DL PPDU 801 (or other packets or frames associated with the first BSS). For example, if the signal strength of DL PPDU 802 at a respective STA is greater than a level at the respective STA and the DL PPDU 802 arrives at the respective STA slightly earlier than DL PPDU 801, then the respective STA may detect and lock onto the DL PPDU 802 transmitted from AP2 rather than the DL PPDU 801 transmitted from AP1. The STA may decode fields and subfields of the preamble of DL PPDU 802 until the STA obtains an indication of the BSS associated with the DL PPDU 802. In some aspects, the STA may decode the preamble of DL PPDU 802 until the BSS Color value carried in the preamble is obtained. The STA may use the obtained BSS Color value to determine whether the DL PPDU 802 is an intra-BSS packet or an OBSS packet.

For instances in which the STA determines that the DL PPDU 802 is an OBSS packet transmitted from another participating AP, the STA may discard the DL PPDU 802 and listen to the wireless medium for intra-BSS transmissions (such as the DL PPDU 801). Aspects of the present disclosure recognize that because the preambles of the DL PPDUs 801-803 are temporally aligned with each other, the STA may miss the preamble of DL PPDU 801 while decoding the preamble of DL PPDU 802, and therefore may fail to receive data carried in the DL PPDU 801 from AP1 in the presence of OBSS interference from AP2. In some implementations, the likelihood of the STA (and other STAs associated with AP1) missing intra-BSS packets while decoding the preamble of an OBSS packet may be reduced (or eliminated) by offsetting the transmissions of DL PPDUs 801-803 from one another by a time period, as described with reference to FIG. 9A.

Figure 9A:
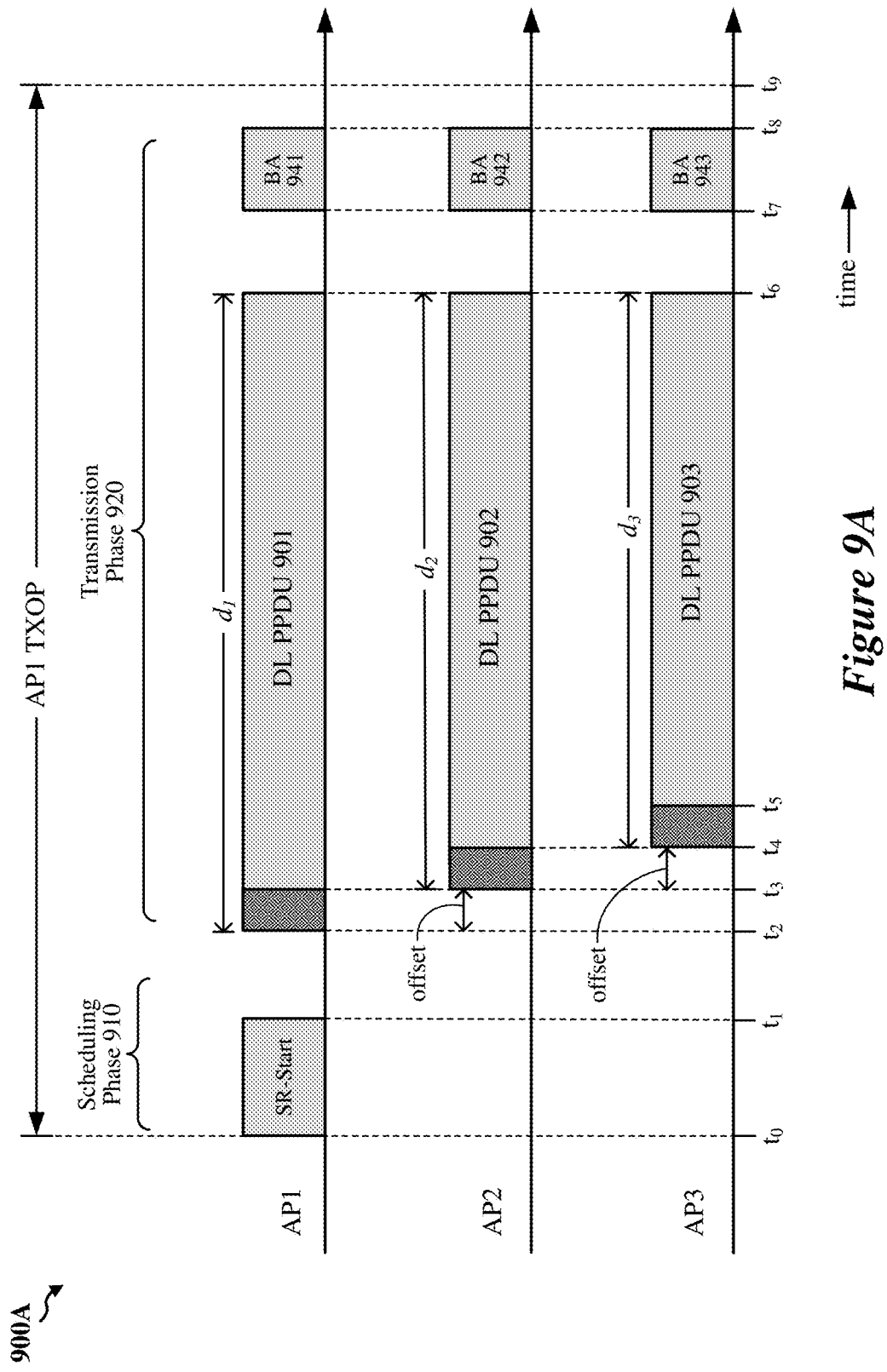
FIGS. 9A-9C show timing diagrams of example wireless communications that support coordinated spatial reuse for DL transmissions according to some other implementations.

FIG. 9A shows a timing diagram of an example wireless communication 900A that supports coordinated spatial reuse for DL transmissions according to some other implementations. The wireless communication 900A is shown to include AP1, AP2, and AP3 described with reference to FIGS. 7A, 7B, and 8. In some implementations, the wireless communication 900A may be another example of the wireless communication 700B of FIG. 7B. In some aspects, the resource polling phase and the scheduling phase 910 of FIG. 9A are similar to the polling phase and scheduling phase 810, respectively, described with reference to FIG. 8, with at least one notable exception (for simplicity, the resource polling phase is not shown in FIG. 9A). For example, while the scheduling information carried in the SR Start frame of FIG. 8 indicates that the start times for DL transmissions from AP1-AP3 are the same, the scheduling information carried in the SR Start frame of FIG. 9A indicates that the start times for DL transmissions from AP1-AP3 are offset from each other by a time period.

The scheduling phase 910 begins at time to with AP1 transmitting an SR Start frame over the wireless medium to AP2 and AP3. As discussed, the SR Start frame may indicate scheduling information and resource allocations associated with the participating APs for DL transmissions. Each of AP2 and AP3 receives the SR Start frame, and may obtain the DL transmission start times and resource allocations indicated by AP1.

The transmission phase 920 begins at time $t_2$ with AP1 transmitting a DL PPDU 901 to one or more STAs associated with the first BSS. At time $t_3$, AP2 begins transmitting a DL PPDU 902 to one or more STAs associated with the second BSS. At time $t_4$, AP3 begins transmitting a DL PPDU 903 to one or more STAs associated with the third BSS. Thus, the start of the transmission of DL PPDU 902 to STAs associated with the second BSS is offset by a time period relative to the start of the transmission of DL PPDU 901 to STAs associated with the first BSS. Similarly, the start of the transmission of DL PPDU 903 to STAs associated with the third BSS is offset by a time period relative to the start of the transmission of DL PPDU 902 to STAs associated with the second BSS. Although the example of FIG. 9A shows each of AP1, AP2, and AP3 transmitting a single DL PPDU during the transmission phase 920 for simplicity, in some other implementations, each of AP1, AP2, and AP3 may transmit a plurality of DL PPDUs to their associated STAs during the transmission phase 920.

In some instances, the time offset between times $t_2$ and $t_3$ may allow STAs associated with the first BSS to detect the DL PPDU 901, decode the preamble, and use the decoded preamble to determine that the DL PPDU 901 is an intra-BSS packet that may be intended for one or more STAs associated with the first BSS. Additionally, the time offset between times $t_2$ and $t_3$ may allow STAs associated with the second BSS that receive the DL PPDU 901 from AP1 to determine that the DL PPDU 901 is an OBSS packet and discard the DL PPDU 901 prior to the transmission of the DL PPDU 902 from AP2. Similarly, the time offset between times $t_3$ and $t_4$ may allow STAs associated with the second BSS to detect the DL PPDU 902, decode the preamble, and use the decoded preamble to determine that the DL PPDU 902 is an intra-BSS packet that may be intended for one or more STAs associated with the second BSS. Additionally, the time offset between times $t_3$ and $t_4$ may allow STAs associated with the third BSS that receive the DL PPDU 902 from AP2 to determine that the DL PPDU 902 is an OBSS packet and to discard the packet prior to the transmission of the DL PPDU 903 from AP3.

In some implementations, the length or duration of one or more of the DL PPDUs 901-903 may be selectively adjusted or configured so that the respective transmissions of the DL PPDUs 901-903 end at the same time. For example, in some instances, the transmit duration $d_1$ of DL PPDU 901 may be configured or adjusted such that transmission of DL PPDU 901 ends at time $t_6$. Similarly, the transmit duration $d_2$ of DL PPDU 902 may be configured or adjusted such that transmission of DL PPDU 902 also ends at time $t_6$, and the transmit duration $d_3$ of DL PPDU 903 may be configured or adjusted such that transmission of DL PPDU 903 also ends at time $t_6$.

In some instances, aligning the transmission end times of the DL PPDUs 901-903 with each other may cause STAs that received the DL PPDUs 901-903 to transmit acknowledgements to their respective APs at the same time. For example, the STAs associated with each of the first, second, and third BSSs may transmit acknowledgements to their respective APs after a period of time from time $t_6$. In some instances, STAs associated with AP1, AP2, and AP3 transmit BA frames 941-943 to their respective APs at time $t_7$, which occurs a SIFS duration after time $t_6$. The BA frames 941-943 may be received by AP1-AP3, respectively, at time $t_8$. In some instances, the transmission phase 920 ends at time $t_8$, and the TXOP obtained by AP1 ends at time $t_9$. In other instances, the TXOP obtained by AP1 may extend beyond time $t_9$, and the transmission phase 920 may extend beyond time $t_8$.

Aligning the transmissions of BA frames 941-943 with each other may allow OBSS transmissions associated with the second or third BSS to interfere with the ability of AP1 to detect or receive BA frames 941 transmitted by its associated STAs. For example, if the signal strength of BA frame 942 at AP1 is greater than a level, then AP1 may detect and lock onto the BA frame 942 transmitted by STAs associated with the second BSS rather than the BA frame 941 transmitted by STAs associated with the first BSS. In some instances, AP1 may decode fields and subfields of the preamble of BA frame 942 until obtaining an indication of the BSS associated with the BA frame 942. In some aspects, AP1 may decode the preamble of BA frame 942 until the BSS Color value carried in the preamble of BA frame 942 is obtained. AP1 may use the obtained BSS Color value, or some other indication of the BSS (such as the MAC address) to determine whether the BA frame 942 is an intra-BSS packet or an OBSS packet.

After determining that the BA frame 942 is an OBSS packet, AP1 may discard the BA frame 942 and begin listening on the wireless medium for BA frames transmitted from its associated STAs. In some instances, when AP1 begins listening to the wireless medium again, the preamble of BA frame 941 may have already been transmitted over the wireless medium, which in turn may lead AP1 to incorrectly conclude that its associated STAs did not transmit any acknowledgments responsive to receiving the DL PPDU 901.

In some implementations, the likelihood of a respective AP missing BA frames transmitted from its associated STAs while decoding the preamble of a BA frame associated with another BSS may be reduced (or eliminated) by offsetting the respective transmissions of BA frames 941-943 by a time period relative to one another, as described with reference to FIG. 9B.

Figure 9B:
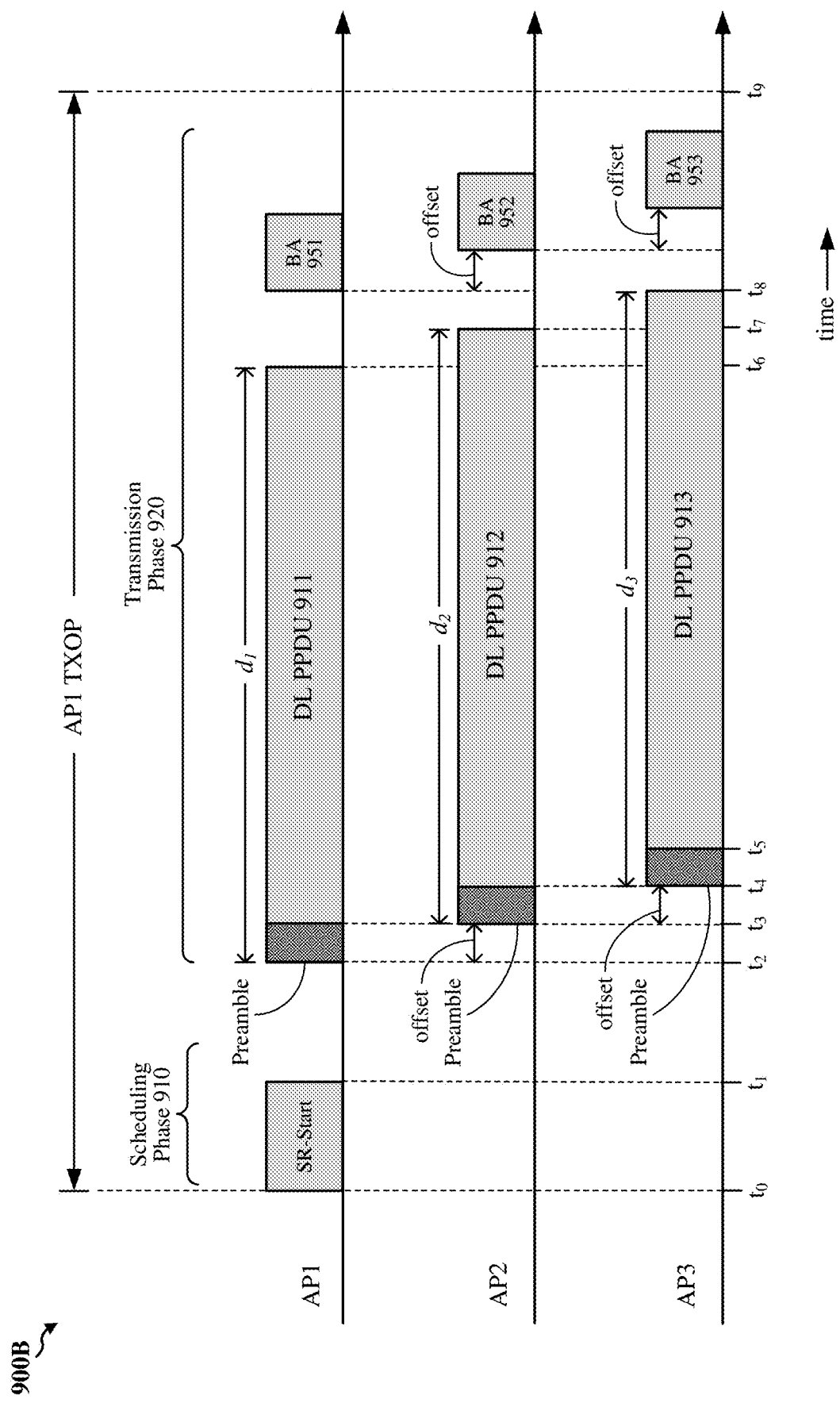

FIG. 9B shows a timing diagram of another example wireless communication 900B that supports coordinated spatial reuse for DL transmissions according to some other implementations. The wireless communication 900B is shown to include AP1, AP2, and AP3 described with reference to FIGS. 7A, 7B, and 8. In some implementations, the wireless communication 900B may be another example of the wireless communication 700B of FIG. 7B. In some aspects, the resource polling phase and the scheduling phase 910 of FIG. 9B are similar to the polling phase 705 and scheduling phase 710, respectively, described with reference to FIG. 7B (for simplicity, the resource polling phase is not shown in FIG. 9B).

The transmission phase 920 begins at time $t_2$ with AP1 transmitting a DL PPDU 911 to one or more STAs associated with the first BSS. At time $t_3$, which is offset from time $t_2$ by a time period, AP2 transmits a DL PPDU 912 to one or more STAs associated with the second BSS. At time $t_4$, which is offset from time $t_3$ by the time period, AP3 transmit a DL PPDU 913 to one or more STAs associated with the third BSS. Although the example of FIG. 9B shows each of AP1, AP2, and AP3 transmitting a single DL PPDU during the transmission phase 920 for simplicity, in some other implementations, each of AP1, AP2, and AP3 may transmit a plurality of DL PPDUs to their associated STAs during the transmission phase 920.

In the example of FIG. 9B, the length or duration of one or more of the DL PPDUs 911-913 may be selectively adjusted or configured such that their respective transmit durations $d_1$, $d_2$, and $d_3$ are the same as one another. For example, in some instances, the transmit duration $d_1$ of DL PPDU 911 may be configured or adjusted such that the transmission of DL PPDU 911 ends at time $t_6$, the transmit duration $d_2$ of DL PPDU 912 may be configured or adjusted such that the transmission of DL PPDU 912 ends at time $t_7$ (which is offset from time $t_6$ by the time period), and the transmit duration $d_3$ of DL PPDU 913 may be configured or adjusted such that the transmission of DL PPDU 913 ends at time $t_8$ (which is offset from time $t_7$ by the time period).

In some aspects, offsetting the transmission end times of DL PPDUs 911-913 by the time period results in the transmission start times of acknowledgements responsive to the DL PPDUs 911-913 being offset from each other by the time period. For example, STAs associated with the first BSS may transmit BA frames 951 to AP1 after a SIFS duration from the end of DL PPDU 911, STAs associated with the second BSS may transmit BA frames 952 to AP2 after a SIFS duration from the end of DL PPDU 912, and STAs associated with the third BSS may transmit BA frames 953 to AP3 after a SIFS duration from the end of DL PPDU 913, where the transmission of BA frames 952 are offset from the transmission of BA frames 951 by the time period, and the transmission of BA frames 953 are offset from the transmission of BA frames 952 by the time period. The BA frames 951-953 may be received by AP1-AP3, respectively, at times that are offset from one another by the time period.

In some implementations, the time period between the transmission start times of respective BA frames 951-953 may be the same as the time period between the transmission start times of the DL PPDUs 911-913. For example, the time period between the transmission start time of BA frames 951 and the transmission start time of BA frames 952 may be the same as the time period between times $t_2$ and $t_3$, and the time period between the transmission start time of BA frames 952 and the transmission start time of BA frames 953 may be the same as the time period between times $t_3$ and $t_4$. By using the same timing offset between transmission start times of the BA frames 951-953 and between transmission start times of the DL PPDUs 911-913, aspects of the present disclosure may ensure that AP3 does not miss the BA frame 953 transmitted from one or more of its associated STAs while decoding BA frames 951 or 952 transmitted from OBSS STAs. For example, the offset may be selected based on one or both of the formats of the DL PPDUs 911-913 and the formats of the BA frames 951-953 to ensure that AP3 does not miss BA frame 953 transmitted from one or more of its associated STAs while decoding BA frames 951 or 952 transmitted from OBSS STAs associated with AP1 or AP2.

In some instances, the transmission phase 920 ends at time $t_{11}$, and the TXOP obtained by AP1 ends at time $t_{12}$. In other instances, the TXOP obtained by AP1 may extend beyond time $t_{12}$, and the transmission phase 920 may extend beyond time $t_{11}$.

Figure 9C:
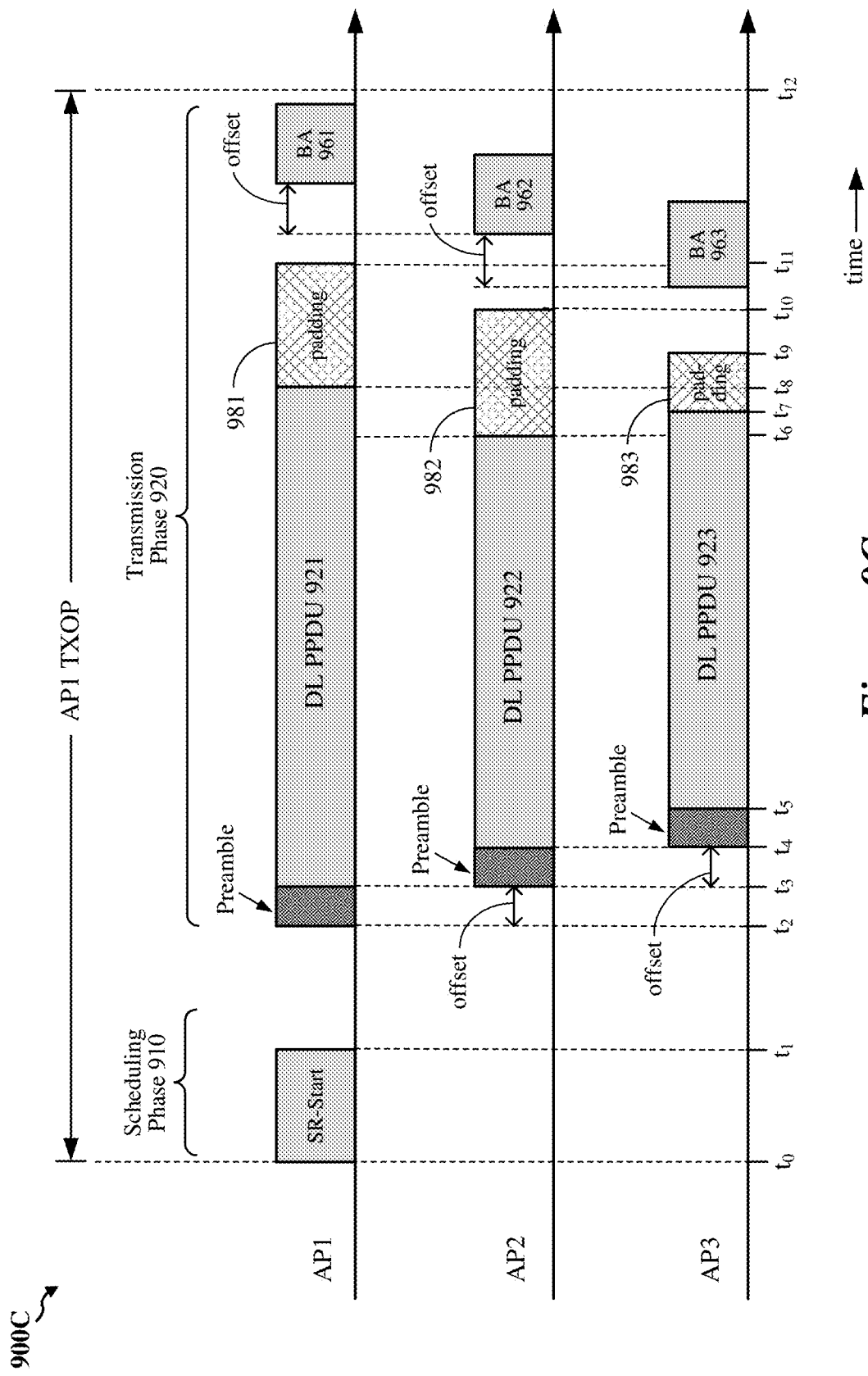

FIG. 9C shows a timing diagram of another example wireless communication 900C that supports coordinated spatial reuse for DL transmissions according to some other implementations. The wireless communication 900C is shown to include AP1, AP2, and AP3 described with reference to FIGS. 7A, 7B, and 8. In some implementations, the wireless communication 900C may be another example of the wireless communication 700B of FIG. 7B. In some aspects, the resource polling phase and the scheduling phase 910 of FIG. 9C are similar to the polling phase 705 and scheduling phase 710, respectively, described with reference to FIG. 7B (for simplicity, the resource polling phase is not shown in FIG. 9C).

The transmission phase 920 begins at time $t_2$ with AP1 transmitting a DL PPDU 921 to one or more STAs associated with the first BSS. At time $t_3$, which is offset from time $t_2$ by a time period, AP2 transmits a DL PPDU 922 to one or more STAs associated with the second BSS. At time $t_4$, which is offset from time $t_3$ by the time period, AP3 transmit a DL PPDU 923 to one or more STAs associated with the third BSS. Although the example of FIG. 9C shows each of AP1, AP2, and AP3 transmitting a single DL PPDU during the transmission phase 920 for simplicity, in some other implementations, each of AP1, AP2, and AP3 may transmit a plurality of DL PPDUs to their associated STAs during the transmission phase 920.

In the example of FIG. 9C, the lengths or durations of the DL PPDUs 921-923 may be different than one another such that the transmission end times of DL PPDUs 921-923 are offset from each other by different time periods and do not occur in the same order as the transmission start times of the DL PPDUs 921-923. For example, while the DL PPDU 921 transmitted from AP1 is the first DL transmission at time $t_2$, the DL PPDU 921 has the latest transmission end time, at time $t_8$. For another example, while the DL PPDU 922 transmitted from AP2 is the second DL transmission at time $t_3$, the DL PPDU 922 has the earliest transmission end time, at time $t_6$. As a result, the DL PPDUs 921-923 are misaligned with one another in a manner that not only prevents their transmission using MU-MIMO, but also fails to prevent a STA from missing intra-BSS transmissions (such as DL PPDUs) while decoding the preamble of an OBSS packet.

Aspects of the present disclosure recognize that adjusting the durations of DL PPDUs 921-923 may not always be feasible. As such, in some implementations, one or more of AP1, AP2, and AP3 can add different amounts of padding to respective DL PPDUs 921, 922, and 923 such that the transmission end times of the DL PPDUs 921-923 are offset from each other by a time period. In some instances, the time period may correspond to an amount of time associated with decoding the preamble of a wireless packet and determining, from the decoded preamble, whether the wireless packet is an intra-BSS packet or an OBSS packet. In the example of FIG. 9C, AP3 adds an amount of padding 983 to the DL PPDU 923 such that the transmission end time of the padded DL PPDU 923 is at time $t_9$, AP2 adds an amount of padding 982 to the DL PPDU 922 such that the transmission end time of the padded DL PPDU 922 is at time $t_{10}$, and AP1 adds an amount of padding 981 to the DL PPDU 921 such that the transmission end time of the padded DL PPDU 921 is at time $t_{11}$, for example, where time $t_{10}$ is offset from time $t_9$ by the period, and time $t_{11}$ is offset from time $t_{10}$ by the period. In this way, the time offset between the transmission end times of respective DL PPDUs 921-923 may be the same as (or similar to) the time offset between the transmission start times of respective DL PPDUs 921-923.

In some aspects, offsetting the transmission end times of DL PPDUs 921-923 by the time period results in the transmission start times of acknowledgements responsive to the DL PPDUs 921-923 being offset from each other by the time period. For example, STAs associated with the third BSS may transmit BA frames 963 to AP3 after a SIFS duration from the end of DL PPDU 923, STAs associated with the second BSS may transmit BA frames 962 to AP2 after a SIFS duration from the end of DL PPDU 922, and STAs associated with the first BSS may transmit BA frames 961 to AP1 after a SIFS duration from the end of DL PPDU 921, where the transmission of BA frames 962 are offset from the transmission of BA frames 963 by the time period, and the transmission of BA frames 961 are offset from the transmission of BA frames 962 by the time period. The BA frames 961-963 may be received by AP1-AP3, respectively, at times that are offset from one another by the time period.

In some instances, the TXOP obtained by AP1 ends at time $t_{12}$. In other instances, the TXOP obtained by AP1 may extend beyond time $t_{12}$.

Figure 10:
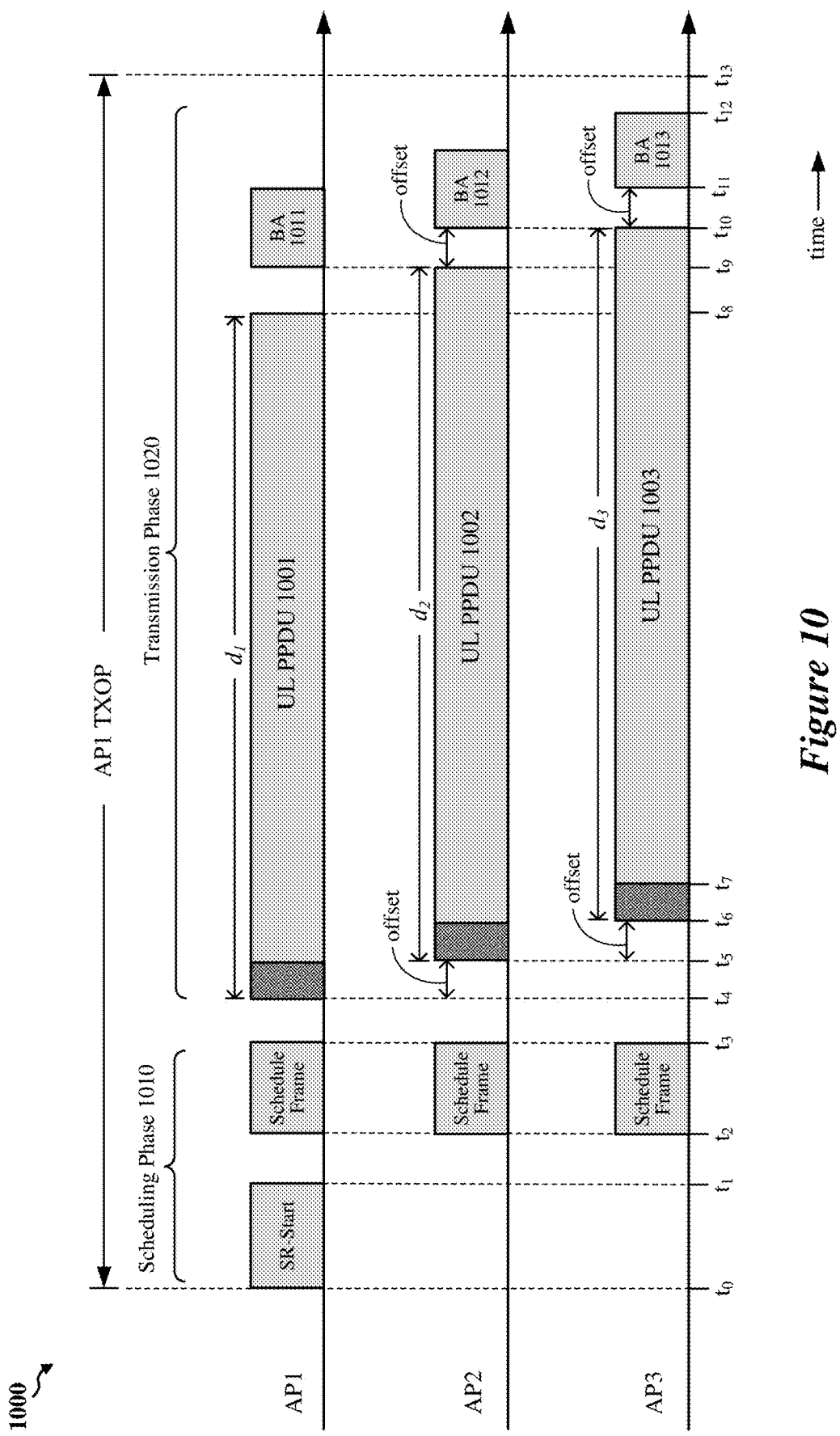
FIG. 10 shows a timing diagram of an example wireless communication that supports coordinated spatial reuse for UL transmissions according to some other implementations.

FIG. 10 shows a timing diagram of an example wireless communication 1000 that supports coordinated spatial reuse for UL transmissions according to some other implementations. The wireless communication 1000 is shown to include AP1, AP2, and AP3 described with reference to FIGS. 7A, 7B, and 8. In some implementations, the wireless communication 1000 may be one implementation of the wireless communication 700A of FIG. 7A. In some aspects, the resource polling phase and the scheduling phase 1010 of the example of FIG. 10 are similar to the polling phase 705 and scheduling phase 710, respectively, described with reference to FIG. 7A (for simplicity, the resource polling phase is not shown in FIG. 10). In the example of FIG. 10, the coordinated access point transmission session may be designated for UL transmissions to AP1, AP2, and AP3.

The scheduling phase 1010 begins with AP1 transmitting an SR Start frame over the wireless medium to AP2 and AP3 between times $t_0$ and $t_1$. The SR Start frame may identify AP2 and AP3 (and other selected APs, if any), and may indicate scheduling information for UL transmissions to each of AP1, AP2, and AP3 during the coordinated access point transmission session. The SR Start frame may also allocate wireless resources to the first, second, and third BSSs operated by AP1, AP2, and AP3, respectively. In some aspects, the SR Start frame may indicate one or more portions of the TXOP shared by the first AP during the transmission phase 1030.

As discussed, the scheduling information may indicate start times for UL transmissions to each of AP1, AP2, and AP3. The scheduling information may also indicate one or more of an MCS to be used for UL transmissions to each AP, a transmit power level to be used for UL transmissions to each AP, or a duration of an UL transmission to each AP. In some implementations, the SR Start frame may also include instructions for AP2 and AP3 to re-transmit the scheduling information and resource allocations carried in the SR Start frame to their associated STAs in one or more schedule frames. In some instances, the schedule frame may be transmitted to the one or more STAs associated with a respective AP as a plurality of non-HT duplicate PPDUs over a corresponding plurality of subchannels of the wireless medium. In this way, STAs having queued UL data may be able to detect and receive the schedule frames, irrespective of the particular subchannel or subchannels on which the STAs operate or camp.

AP2 and AP3 receive the SR Start frame, and may decode the SR Start frame to obtain the scheduling information and resource allocations provided by AP1. In some instances, AP2 and AP3 may transmit a CTS frame over the wireless medium to acknowledge reception of the SR Start frame. In other instances, AP2 and AP3 may not transmit frames responsive to the SR Start frame.

At time $t_2$, AP1, AP2, and AP3 transmit a schedule frame over the wireless medium to their associated STAs. The schedule frames may include the same information that is carried in the SR Start frame such as (but not limited to) the scheduling information and resource allocations, for example, to ensure that all of the STAs associated with AP2 and AP3 obtain the scheduling information and resource allocations prior to the start of the transmission phase 1020. For example, although AP2 and AP3 may be within wireless range of AP1 and able to receive and decode the SR Start frame, some of the STAs associated with AP2 or AP3 (or both) may not be within wireless range of AP1, and therefore may not be able to receive or decode the SR Start frame transmitted by AP1. In this way, STAs associated with AP2 may obtain the resource allocations and scheduling information from the schedule frame transmitted by AP2, and STAs associated with AP3 may obtain the resource allocations and scheduling information from the schedule frame transmitted by AP3.

As discussed, in some implementations, the schedule frames may be the same as or similar to the SR Start frame. In some implementations, the schedule frames may be identical to each other and carry the same information as the SR Start frame. For example, the schedule frames may have the same format and the same transmit duration as one another, may be transmitted using the same MCS as one another, and so on. In this way, the transmission of a schedule frame from a respective AP may have minimal, if any, impact on the transmission of schedule frames from other APs participating in the coordinated access point transmission session. As discussed, in some instances, the schedule frames may be transmitted over the wireless medium as a plurality of identical non-HT duplicate PPDUs. The STAs associated with AP1, AP2, and AP3 receive the schedule frames between times $t_3$ and $t_4$, and obtain the scheduling information and resource allocations indicated in the SR Start frame.

The transmission phase 1020 begins at time $t_4$ with AP1 receiving an UL PPDU 1001 from one or more STAs associated with the first BSS. At time $t_5$, which is offset from time $t_4$ by a time period, AP2 begins receiving an UL PPDU 1002 from one or more STAs associated with the second BSS. At time $t_6$, which is offset from time $t_5$ by the time period, AP3 begins receiving an UL PPDU 1003 from one or more STAs associated with the third BSS. In some implementations, the transmit duration $d_1$ of UL PPDU 1001 may be configured or adjusted such that the transmission of UL PPDU 1001 ends at time $t_8$, the transmit duration $d_2$ of UL PPDU 1002 may be configured or adjusted such that the transmission of UL PPDU 1002 ends at time $t_9$ (which is offset from time $t_8$ by the time period), and the transmit duration $d_3$ of UL PPDU 1003 may be configured or adjusted such that the transmission of UL PPDU 1003 ends at time $t_{10}$ (which is offset from time $t_9$ by the time period). Although the example of FIG. 10 shows each of AP1, AP2, and AP3 receiving a single UL PPDU during the transmission phase 1020 for simplicity, in some other implementations, each of AP1, AP2, and AP3 may receive a plurality of UL PPDUs from their associated STAs during the transmission phase 1020.

In some implementations, AP1 may detect transmission of the UL PPDU 1001, decode the preamble of UL PPDU 1001 between times $t_4$ and $t_5$, and use the decoded preamble to determine that the UL PPDU 1001 is an intra-BSS packet. Similarly, AP2 may detect transmission of the UL PPDU 1002, decode the preamble of UL PPDU 1002 between times $t_5$ and $t_6$, and use the decoded preamble to determine that the UL PPDU 1002 is an intra-BSS packet. AP3 may detect transmission of the UL PPDU 1003, decode the preamble of UL PPDU 1003 between times $t_6$ and $t_7$, and use the decoded preamble to determine that the UL PPDU 1003 is an intra-BSS packet. In the example of FIG. 10, the transmission of UL PPDU 1001 to AP1 ends at time $t_8$, the transmission of UL PPDU 1002 to AP2 ends at time $t_9$, and the transmission of UL PPDU 1003 to AP3 ends at time $t_{10}$.

In some instances, offsetting the transmission end times of UL PPDUs 1001-1003 by the time period results in the transmission start times of acknowledgements responsive to the UL PPDUs 1001-1003 being offset from each other by the time period. For example, AP1 transmits a BA frame 1011 over the wireless medium to acknowledge successful reception of the UL PPDU 1001 at time $t_9$ (which may be a SIFS duration after time $t_8$), AP2 transmits a BA frame 1012 over the wireless medium to acknowledge successful reception of the UL PPDU 1002 at time $t_{10}$ (which may be a SIFS duration after time $t_9$), and AP3 transmits a BA frame 1013 over the wireless medium to acknowledge successful reception of the UL PPDU 1003 at time $t_{11}$ (which may be a SIFS duration after time $t_{10}$). In this way, the transmission of BA frames 1012 are offset from the transmission of BA frames 1011 by the time period, and the transmission of BA frames 1013 are offset from the transmission of BA frames 1012 by the time period. In some instances, the transmission phase 1020 ends at time $t_{12}$, and the TXOP obtained by AP1 ends at time $t_{13}$. In other instances, the TXOP obtained by AP1 may extend beyond time $t_{13}$, and the transmission phase 1020 may extend beyond time $t_{12}$.

Although not shown for simplicity, in some other implementations, AP1 may transmit a trigger frame over the wireless medium to AP2 and AP3 between times $t_3$ and $t_4$. The trigger frame may identify AP2 and AP3, and may allocate wireless resources to the BSSs operated by AP2 and AP3. The trigger frame may be any suitable trigger frame including (but not limited to) a basic trigger frame or an MU-RTS trigger frame.

In some implementations, the offset between times $t_4$ and $t_5$ may be based on an amount of time associated with AP1 decoding the preamble of a wireless packet and determining, based on the decoded preamble, whether the wireless packet is an intra-BSS packet or an OBSS packet. For example, the offset between times $t_4$ and $t_5$ may allow AP1 to detect transmission of the UL PPDU 1001, decode the preamble of UL PPDU 1001, and use the decoded preamble to determine that the UL PPDU 1001 is an intra-BSS packet likely intended for AP1.

For instances in which AP2 also detects the transmission of UL PPDU 1001 and begins decoding the UL PPDU 1001, the offset between times $t_4$ and $t_5$ may allow AP2 time to decode the preamble of UL PPDU 1001, determine that the UL PPDU 1001 is an OBSS packet based on the decoded preamble (such as the BSS Color value carried in the preamble of UL PPDU 1001), and discard the UL PPDU 1001 prior to reception of the UL PPDU 1002 by AP2. Then, between times $t_5$ and $t_6$, AP2 may detect transmission of the UL PPDU 1002, decode the preamble of UL PPDU 1002, and use the decoded preamble to determine that the UL PPDU 1002 is an intra-BSS packet likely intended for AP2.

For instances in which AP3 detects the transmission of UL PPDU 1002 and begins decoding the UL PPDU 1002, the offset between times $t_5$ and $t_6$ may allow AP3 time to decode the preamble of UL PPDU 1002, determine that the UL PPDU 1002 is an OBSS packet based on the decoded preamble (such as a BSS Color value), and discard the UL PPDU 1002 prior to reception of the UL PPDU 1003 by AP3. Then, between times $t_6$ and $t_7$, AP3 may detect transmission of the UL PPDU 1003, decode the preamble of UL PPDU 1003, and use the decoded preamble to determine that the UL PPDU 1003 is an intra-BSS packet likely intended for AP3.

In some implementations, the length or duration of one or more of the UL PPDUs 1001-1003 may be selectively adjusted or configured such that their respective durations $d_1$, $d_2$ and $d_3$ are the same to ensure that the transmissions of corresponding BA frames 1011-1013 are also offset from one another by the time period. In this way, aspects of the present disclosure may ensure that the BA frames 1011-1013 are received and successfully decoded by AP1, AP2, and AP3, respectively.

Figure 11:
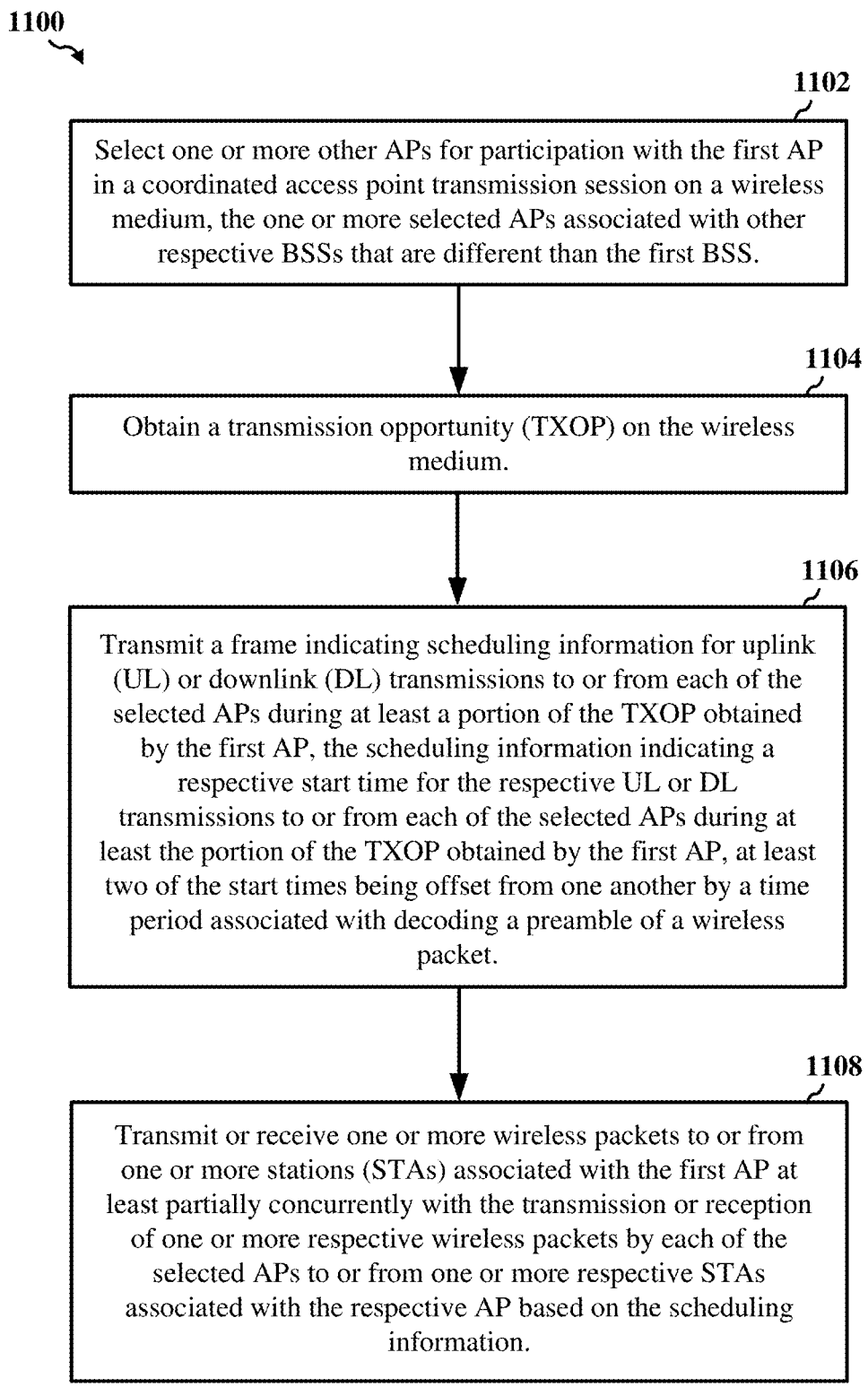
FIG. 11 shows a flowchart illustrating an example process for wireless communication that supports coordinated spatial reuse transmissions according to some implementations.

FIG. 11 shows a flowchart illustrating an example process 1100 for wireless communication that supports coordinated spatial reuse transmissions according to some implementations. The process 1100 may be performed by a wireless communication device such as the wireless communication device 500 described with reference to FIG. 5. In some implementations, the process 1100 may be performed by a first AP associated with a first BSS, such as one of the APs 102 and 602 described with reference to FIGS. 1 and 6A, respectively. For example, in some instances, the process 1100 may be performed by the first AP described with reference to one or more of FIG. 7, 8, 9A-9C, or 10.

In some implementations, the process 1100 begins in block 1102 with selecting one or more other APs for participation with the first AP in a coordinated access point transmission session on a wireless medium, where the one or more selected APs are associated with other respective BSSs that are different than the first BSS. In block 1104, the process 1100 continues with obtaining a transmission opportunity (TXOP) on the wireless medium. In block 1106, the process 1100 continues with transmitting a frame indicating scheduling information for uplink (UL) or downlink (DL) transmissions to or from each of the selected APs during at least a portion of the TXOP obtained by the first AP, the scheduling information indicating a respective start time for the respective UL or DL transmissions to or from each of the selected APs during at least the portion of the TXOP obtained by the first AP, at least two of the start times being offset from one another by a time period associated with decoding a preamble of a wireless packet. In block 1108, the process 1100 continues with transmitting or receiving one or more wireless packets to or from one or more STAs associated with the first AP at least partially concurrently with the transmission or reception of one or more respective wireless packets by each of the selected APs to or from one or more respective STAs associated with the respective AP based on the scheduling information. In some aspects, the frame may indicate whether the coordinated access point transmission session is designated for UL transmissions or DL transmissions. In some other aspects, the frame may indicate an allocation of wireless resources for each of the selected APs during at least the portion of the TXOP obtained by the first AP.

In some implementations, the respective start times of the UL or DL transmissions to or from the selected APs are based at least in part on one or both of signal strengths of wireless packets received by the first AP from the selected APs or levels of interference associated with the selected APs. In some instances, the respective start times of the UL or DL transmissions to or from at least some of the selected APs may be the same, for example, based at least in part on the respective signal strengths or levels of interference associated with the at least some selected APs being relatively low (such as less than a value). In addition, or in the alternative, the respective start times of the UL or DL transmissions to or from at least some of the selected APs may be the same, for example, based at least in part on the respective decoding error rates of the first AP and the at least some selected APs being relatively low (such as less than a threshold). In some other instances, the respective start times of the UL or DL transmissions to or from the at least two selected APs may be offset from one another by the time period, for example, based at least in part on the respective signal strengths or levels of interference associated with the at least two selected APs being relatively high (such as greater than a value). In addition, or in the alternative, the respective start times of the UL or DL transmissions to or from the at least two selected APs may be offset from one another by the time period, for example, based at least in part on the respective decoding error rates of the first AP and the at least two selected APs being relatively high (such as greater than the threshold). In some aspects, the time period may be based at least in part on an amount of time associated with a respective AP decoding a preamble of a wireless packet and determining, from the decoded preamble, whether the wireless packet is an intra-BSS packet or an OBSS packet.

In some other implementations, the scheduling information may indicate one or more of a respective modulation and coding scheme (MCS) to be used for the UL or DL transmissions to or from each of the selected APs, a respective transmit power level to be used for the UL or DL transmissions to or from each of the selected APs, or a respective duration of the UL or DL transmissions to or from each of the selected APs. In some instances, the respective durations of the UL or DL transmissions to or from the selected APs may be the same as one another. In some other instances, the respective durations of the UL or DL transmissions to or from the selected APs may be different than one another.

In some instances, the frame may also indicate respective durations of ACK frames or BA frames to be sent by the one or more STAs associated with the respective AP. In some aspects, the respective durations of the ACK frames or the BA frames may be the same as each other. In some other aspects, the respective durations of the ACK frames or the BA frames may be different than one another.

In some other implementations, the frame may also include instructions for each of the selected APs to transmit the scheduling information and resource allocations to the one or more STAs associated with the respective AP in a schedule frame. In some aspects, the schedule frame may be transmitted to the one or more STAs associated with a respective AP as a plurality of high-throughput (HT) duplicates over a corresponding plurality of subchannels of the wireless medium. In this way, STAs associated with DL transmissions from the selected APs may be able to detect and receive the schedule frames, irrespective of the particular subchannel to which the respective STAs listen.

Figure 12:
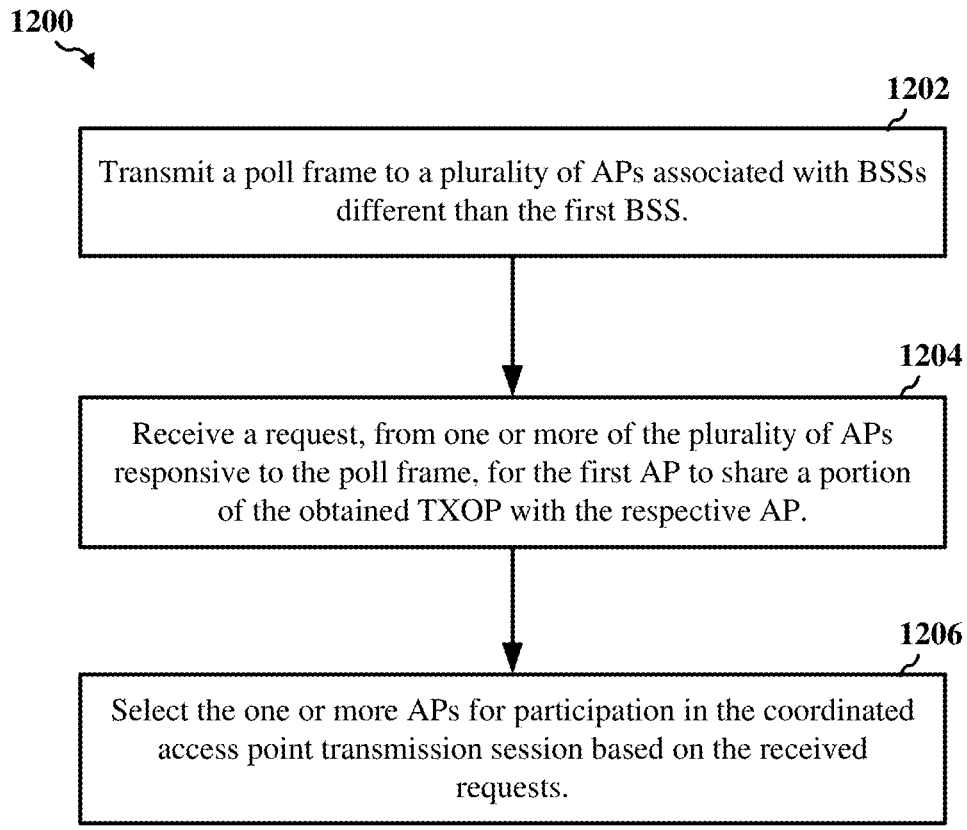
FIG. 12 shows a flowchart illustrating an example process for wireless communication that supports coordinated spatial reuse transmissions according to some implementations.

FIG. 12 shows a flowchart illustrating an example process 1200 for wireless communication that supports coordinated spatial reuse transmissions according to some implementations. The process 1200 may be performed by a wireless communication device such as the wireless communication device 500 described with reference to FIG. 5. In some implementations, the process 1200 may be performed by a first AP associated with a first BSS, such as one of the APs 102 and 602 described with reference to FIGS. 1 and 6A, respectively. For example, in some instances, the process 1200 may be performed by the first AP described with reference to one or more of FIG. 7, 8, 9A-9C, or 10.

In some instances, the process 1200 may be one implementation of selecting the one or more APs in block 1102 of FIG. 11. For example, at block 1202, the process 1200 begins with transmitting a poll frame to a plurality of APs associated with BSSs different than the first BSS. In block 1204, the process 1200 continues with receiving a request, from one or more of the plurality of APs responsive to the poll frame, for the first AP to share a portion of the obtained TXOP with the respective AP. In block 1206, the process 1200 continues with selecting the one or more APs for participation in the coordinated access point transmission session based on the received requests.

Figure 13:
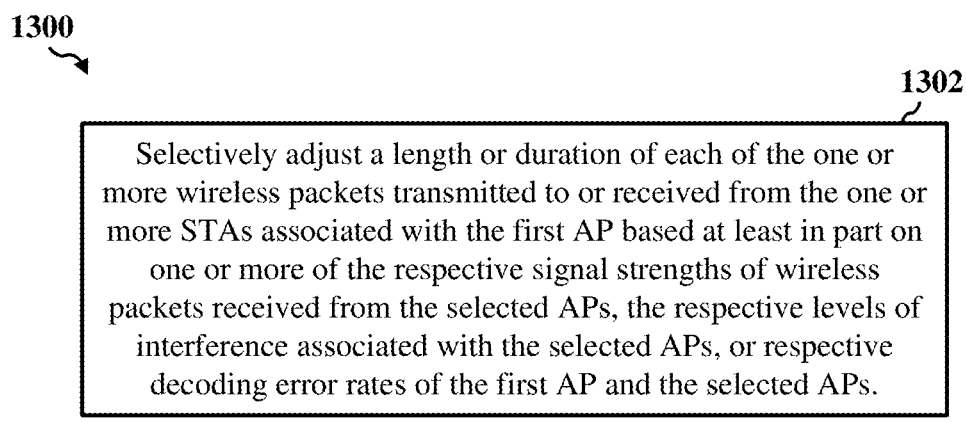
FIG. 13 shows a flowchart illustrating an example process for wireless communication that supports coordinated spatial reuse transmissions according to some implementations.

FIG. 13 shows a flowchart illustrating an example process 1300 for wireless communication that supports coordinated spatial reuse transmissions according to some implementations. The process 1300 may be performed by a wireless communication device such as the wireless communication device 500 described above with reference to FIG. 5. In some implementations, the process 1300 may be performed by a first AP, such as one of the APs 102 and 602 described above with reference to FIGS. 1 and 6A, respectively. For example, in some instances, the process 1300 may be performed by the first AP described with reference to one or more of FIG. 7, 8, 9A-9C, or 10.

In some instances, the process 1300 may be performed in conjunction with transmitting or receiving the one or more wireless packets in block 1108 of FIG. 11. For example, at block 1302, the process 1300 begins with selectively adjusting a length or duration of each of the one or more wireless packets transmitted to or received from the one or more STAs associated with the first AP based at least in part on one or more of the respective signal strengths of wireless packets received from the selected APs, the respective levels of interference associated with the selected APs, or respective decoding error rates of the first AP and the selected APs.

Figure 14A:
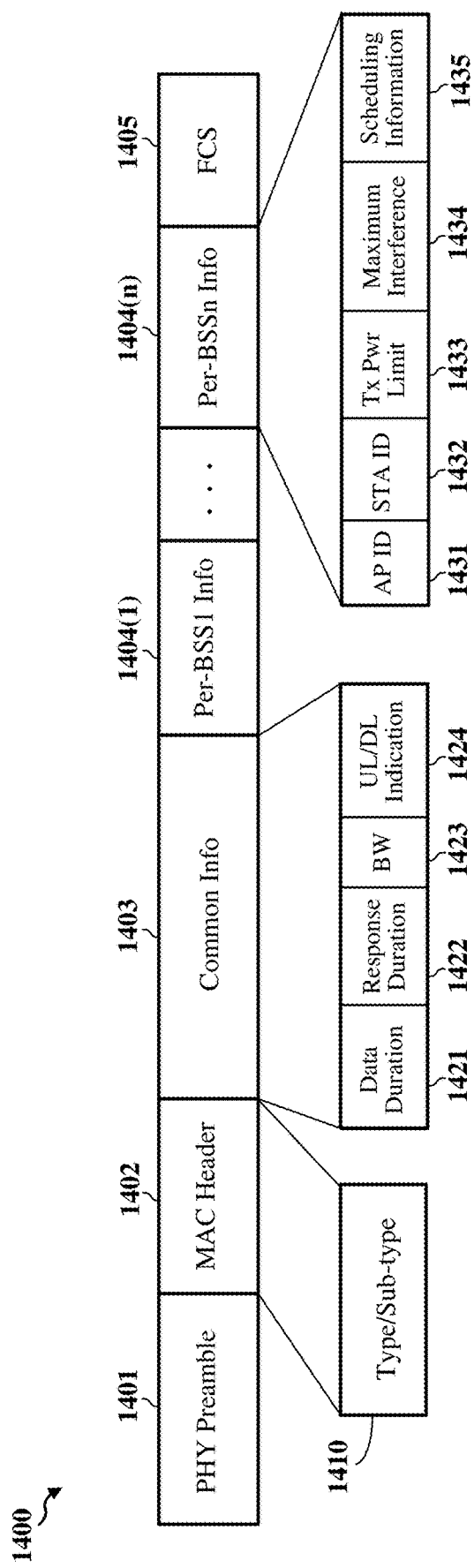
FIG. 14A shows an example Spatial Reuse (SR) Start frame according to some implementations.

FIG. 14A shows an example SR Start frame 1400 according to some implementations. The SR Start frame 1400 is shown to include a PHY preamble 1401, a MAC header 1402, a Common Info field 1403, a plurality of Per-BSS Info fields 1404(1)-1404(n), and a Frame Check Sequence (FCS) field 1405. The PHY preamble 1401 may include a legacy preamble portion and a non-legacy preamble portion (not shown for simplicity). The legacy preamble portion, which may be one example of the legacy preamble portion 322 of FIG. 3B, includes an L-STF, an L-LTF, and an L-SIG field. In some instances, the non-legacy preamble portion may be one example of the HE preamble 324 of FIG. 3B. In other instances, the non-legacy preamble portion may be an EHT preamble. The MAC header 1402 may include a frame control field, a duration field, a receiver address (RA) field, and a transmitter address (TA) field. The frame control field may include type and sub-type fields 1410 that can be set to a new or unused value to indicate the SR Start frame 1400.

The Common Info field 1403 may store information that is common to the APs participating in a coordinated access point transmission session. In some implementations, the Common Info field 1403 may include a Data Duration subfield 1421, a Response Duration subfield 1422, a Bandwidth subfield 1423, and an UL/DL Indication subfield 1424. The Data Duration subfield 1421 may indicate respective time durations of UL or DL transmissions to or from the participating APs. The Response Duration subfield 1422 may indicate respective time durations of ACK or BA frames to be transmitted by STAs associated with the participating APs. The Bandwidth subfield 1423 may indicate the channel width available to the participating APs for UL or DL transmissions during the coordinated access point transmission session. The UL/DL Indication subfield 1424 may indicate whether the coordinated access point transmission session is designated for UL transmissions to the participating APs or for DL transmissions from the participating APs.

Each of the Per-BSS Info fields 1404(1)-1404(n) may store scheduling information for the BSS of a corresponding participating AP. In some instances, each of the Per-BSS Info fields 1404(1)-1404(n) may include one or more of an AP ID subfield 1431, a STA ID subfield 1432, a Tx Power Limit subfield 1433, a Maximum Interference subfield 1434, and a Scheduling Information subfield 1435. The AP ID subfield 1431 carries information that identifies the corresponding participating AP. The STA ID subfield 1432 carries information that identifies the STAs associated with the corresponding participating AP. The Tx Power Limit subfield 1433 may indicate a transmit power level limit that is not to be exceeded during the coordinated access point transmission session. The Maximum Interference subfield 1434 may indicate a maximum level of interference that is tolerable at the corresponding participating AP during the coordinated access point transmission session. The Scheduling Information subfield 1435 may indicate the transmission schedule for UL or DL transmissions to or from a corresponding participating AP. In some instances, the Scheduling Information subfield 1435 may also indicate one or more of a respective MCS to be used for the UL or DL transmissions to or from each of the selected APs, a respective start time to be used for the UL or DL transmissions to or from each of the selected APs, or a respective duration of the UL or DL transmissions to or from each of the selected APs.

In other implementations, the SR Start frame 1400 may be based on a new variant of the basic trigger frame specified by the 802.11ax, 802.11be, and later amendments to the IEEE 802.11 family of wireless communication standards. In some aspects, a new or unused value carried in the subtype field of the MAC header of the basic trigger frame may indicate that the frame is an SR Start frame as disclosed herein. In some other implementations, the SR Start frame 1400 may be based on the MU-RTS trigger frame specified by the 802.11ax, 802.11be, and later amendments to the IEEE 802.11 family of wireless communication standards. In some aspects, one or more reserved bits in the PHY header or MAC header of the MU-RTS trigger frame may be used to indicate that the frame is an SR Start frame.

Figure 14B:
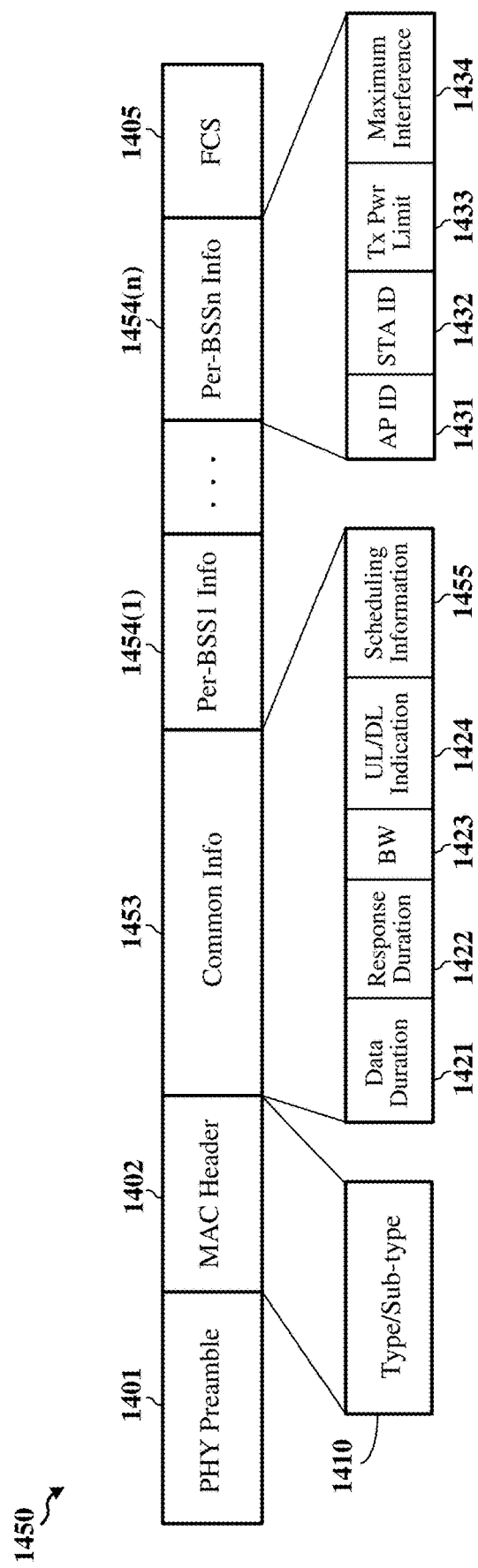
FIG. 14B shows an example SR Start frame according to some other implementations.

FIG. 14B shows an example SR Start frame 1450 according to some other implementations. The SR Start frame 1450 is similar to the SR Start frame 1400 of FIG. 14A, except that the Common Info field 1453 of the SR Start frame 1450 includes the Scheduling Information subfield 1455 (rather than each of the Per-BSS Info fields 1454(1)-1454(n) of the SR Start frame 1450). Specifically, the Scheduling Information subfield 1455 of the SR Start frame 1450 carries schedule information common to all of the APs participating in a coordinated access point transmission session. In some instances, the Scheduling Information subfield 1455 may be a single bit indicating whether or not the start times of UL or DL transmissions to or from the participating APs are offset from one another by a time period. In other instances, the Scheduling Information subfield 1455 may carry common transmission start times, common MCSs, common transmission time offsets, common UL or DL transmission durations, or any combination thereof.

Figure 15:
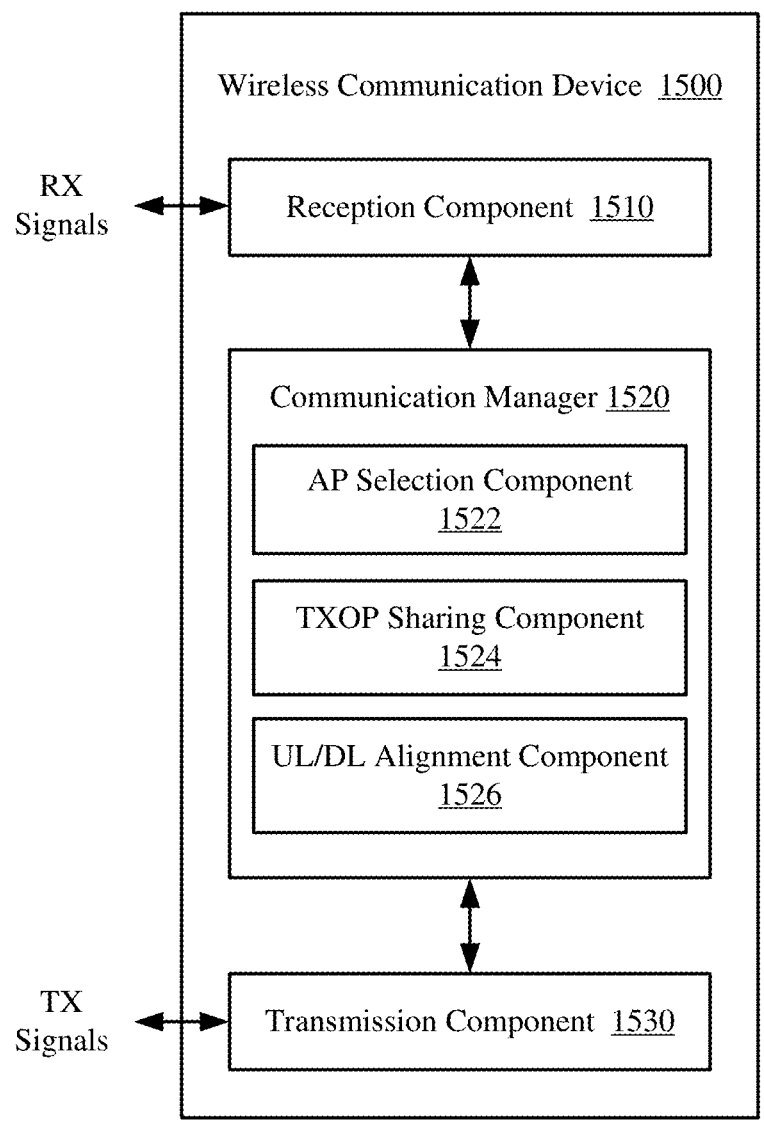
FIG. 15 shows a block diagram of an example wireless communication device, according to some implementations.

FIG. 15 shows a block diagram of an example wireless communication device 1500. In some implementations, the wireless communication device 1500 may be configured to perform one or more of the processes 1100, 1200, or 1300 described above with reference to FIGS. 11, 12, and 13, respectively. The wireless communication device 1500 can be an example implementation of any of the STAs 104 of FIG. 1, the wireless communication device 500 of FIG. 5, or the STA 604 of FIG. 6B. More specifically, the wireless communication device 1500 can be a chip, SoC, chipset, package or device that includes at least one processor and at least one modem (for example, a Wi-Fi (IEEE 802.11) modem or a cellular modem).

The wireless communication device 1500 includes a reception component 1510, a communication manager 1520, and a transmission component 1530. The communication manager 1520 further includes an AP selection component 1522, a TXOP sharing component 1524, and an UL/DL alignment component 1526. Portions of one or more of the components 1522, 1524, or 1526 may be implemented at least in part in hardware or firmware. In some implementations, one or more of the components 1522, 1524, or 1526 are implemented at least in part as software stored in a memory (such as the memory 508 of FIG. 5). For example, portions of one or more of the components 1522, 1524, or 1526 can be implemented as non-transitory instructions (or "code") executable by a processor (such as the processor 506 of FIG. 5) to perform the functions or operations of the respective component.

The reception component 1510 is configured to receive RX signals from one or more other wireless communication devices, and the transmission component 1530 is configured to transmit TX signals to one or more other wireless communication devices. The communication manager 1520 is configured to manage wireless communications with one or more other wireless communication devices. In some implementations, the AP selection component 1522 may identify or select one or more other APs for participation in a coordinated access point transmission session on a wireless medium. The TXOP sharing component 1524 may allocate one or more portions of a TXOP obtained on the wireless medium by the wireless communication device 1500 to the one or more other APs selected for participation in the coordinated access point transmission session. The UL/DL alignment component 1526 may selectively adjust the timing or duration (or both) of UL transmissions to or DL transmissions from the one or more selected APs based on one or more of signal strengths, levels of interference, or decoding error rates of the first AP and the selected APs.

Implementation examples are described in the following numbered clauses:

1. A method for wireless communication by a first access point (AP) associated with a first basic service set (BSS), comprising:

selecting one or more other APs for participation with the first AP in a coordinated access point transmission session on a wireless medium, the one or more selected APs associated with other respective BSSs that are different than the first BSS;

obtaining a transmission opportunity (TXOP) on the wireless medium;

transmitting a frame indicating scheduling information for uplink (UL) or downlink (DL) transmissions to or from each of the selected APs during at least a portion of the TXOP obtained by the first AP, the scheduling information indicating a respective start time for the respective UL or DL transmissions to or from the selected APs during at least the portion of the TXOP obtained by the first AP, at least two of the start times being offset from one another by a time period associated with decoding a preamble of a wireless packet; and transmitting or receiving one or more wireless packets to or from one or more stations (STAs) associated with the first AP at least partially concurrently with the transmission or reception of one or more respective wireless packets by each of the selected APs to or from one or more respective STAs associated with the respective AP based on the scheduling information.

2. The method of clause 1, where the frame indicates whether the coordinated access point transmission session is designated for UL transmissions to or DL transmissions from the selected APs.

3. The method of any one or more of clauses 1-2, where the respective start times of the UL or DL transmissions to or from the selected APs are based at least in part on one or both of signal strengths of wireless packets received by the first AP from the selected APs or levels of interference associated with the selected APs.

4. The method of clause 3, where the respective start times of the UL or DL transmissions to or from at least some of the selected APs are the same as one another based at least in part on the respective signal strengths or levels of interference associated with the at least some selected APs being less than a value.

5. The method of any one or more of clauses 1-3, where the respective start times of the UL or DL transmissions to or from the at least two selected APs are offset from one another by the time period based at least in part on the respective signal strengths or levels of interference associated with the at least two selected APs being greater than a value.

6. The method of any one or more of clauses 1-5, where the scheduling information indicates one or more of a respective modulation and coding scheme (MCS) to be used for the UL or DL transmissions to or from each of the selected APs, a respective transmit power level to be used for the UL or DL transmissions to or from each of the selected APs, or a respective duration of the UL or DL transmissions to or from each of the selected APs.

7. The method of clause 6, where the respective durations of the UL or DL transmissions to or from the selected APs are the same as one another.

8. The method of clause 6, where the respective durations of the UL or DL transmissions to or from at least some of the selected APs are different than one another by a second time period associated with a respective AP of the at least some selected APs decoding a preamble of an acknowledgement (ACK) frame or a block acknowledgement (BA) frame received by the respective AP.

9. The method of any one or more of clauses 1-8, where the frame further indicates respective durations of acknowledgement (ACK) frames or block acknowledgement (BA) frames to be sent by the one or more respective STAs associated with each of the selected APs.

10. The method of clause 9, where the respective durations of the ACK frames or the BA frames are the same as one another.

11. The method of any one or more of clauses 1-10, where the frame further indicates an allocation of time or frequency resources for the respective UL or DL transmissions to or from each of the selected APs during at least the portion of the TXOP obtained by the first AP.

12. The method of any one or more of clauses 1-11, where the selecting includes:
transmitting a poll frame to a plurality of APs associated with BSSs different than the first BSS;
receiving a request, from each of one or more of the plurality of APs responsive to the poll frame, for the first AP to share a portion of the obtained TXOP with the respective AP; and
selecting the one or more APs for participation in the coordinated access point transmission session based on the received requests.

13. The method of any one or more of clauses 1-12, further comprising:
selectively adjusting a length or duration of each of the one or more wireless packets transmitted to or received from the one or more STAs associated with the first AP based at least in part on one or more of the signal strengths of wireless packets received by the first AP from the selected APs, the levels of interference associated with the selected APs, or decoding error rates of the first AP and the selected APs.

14. The method of any one or more of clauses 1-13, where the frame includes instructions for each of the selected APs to transmit the scheduling information to the one or more respective STAs associated with the respective selected AP.

15. The method of clause 14, where the scheduling information is transmitted to the one or more STAs associated with the first AP as a respective plurality of non-high-throughput (HT) duplicates over a corresponding plurality of subchannels of the wireless medium.

16. A first access point (AP) associated with a first basic service set (BSS), comprising:
at least one processor; and
at least one memory communicatively coupled with the at least one processor and storing processor-readable code that, when executed by the at least one processor, is configured to:
  select one or more other APs for participation with the first AP in a coordinated access point transmission session on a wireless medium, the one or more selected APs associated with other respective BSSs that are different than the first BSS;
  transmit a frame indicating scheduling information for uplink (UL) or downlink (DL) transmissions to or from each of the selected APs during at least a portion of the TXOP obtained by the first AP, the scheduling information indicating a respective start time for the respective UL or DL transmissions to or from the selected APs during at least the portion of the TXOP obtained by the first AP, at least two of the start times being offset from one another by a time period associated with decoding a preamble of a wireless packet; and
  transmit or receive one or more wireless packets to or from one or more stations (STAs) associated with the first AP at least partially concurrently with the transmission or reception of one or more respective wireless packets by each of the selected APs to or from one or more respective STAs associated with the respective AP based on the scheduling information.

17. The first AP of clause 16, where the frame indicates whether the coordinated access point transmission session is designated for UL transmissions to or DL transmissions from the selected APs.

18. The first AP of any one or more of clauses 16-17, where the respective start times of the UL or DL transmissions to or from the selected APs are based at least in part on one or both of signal strengths of wireless packets received by the first AP from the selected APs or levels of interference associated with the selected APs.

19. The first AP of clause 18, where the respective start times of the UL or DL transmissions to or from at least some of the selected APs are the same as one another based at least in part on the respective signal strengths or levels of interference associated with the at least some selected APs being less than a value.
20. The first AP of clause 18, where the respective start times of the UL or DL transmissions to or from the at least two selected APs are offset from one another by the time period based at least in part on the determined signal strengths or levels of interference associated with the at least two selected APs being greater than a value.
21. The first AP of any one or more of clauses 16-20, where the scheduling information indicates one or more of a respective modulation and coding scheme (MCS) to be used for the UL or DL transmissions to or from each of the selected APs, a respective transmit power level to be used for the UL or DL transmissions to or from each of the selected APs, or a respective duration of the UL or DL transmissions to or from each of the selected APs.
22. The first AP of clause 21, where the respective durations of the UL or DL transmissions to or from the selected APs are the same as one another.
23. The first AP of clause 21, where the respective durations of the UL or DL transmissions to or from at least some of the selected APs are different than one another by a second time period associated with a respective AP of the at least some selected APs decoding a preamble of an acknowledgement (ACK) frame or a block acknowledgement (BA) frame received by the respective AP.
24. The first AP of any one or more of clauses 16-23, where the frame further indicates respective durations of acknowledgement (ACK) frames or block acknowledgement (BA) frames to be sent by the one or more respective STAs associated with each of the selected APs.
25. The first AP of clause 24, where the respective durations of the ACK frames or the BA frames are the same as one another.
26. The first AP of any one or more of clauses 16-25, where the frame further indicates an allocation of time or frequency resources for the respective UL or DL transmissions to or from each of the selected APs during at least the portion of the TXOP obtained by the first AP.
27. The first AP of any one or more of clauses 16-26, where execution of the processor-readable code for selecting the one or more APs is configured to:
transmit a poll frame to a plurality of APs associated with BSSs different than the first BSS;
receive a request, from one or more of the plurality of APs responsive to the poll frame, for the first AP to share a portion of the obtained TXOP with the respective AP; and
select the one or more APs for participation in the coordinated access point transmission session based on the received requests.
28. The first AP of any one or more of clauses 16-27, where execution of the processor-readable code is further configured to:
selectively adjust a length or duration of each of the one or more wireless packets transmitted to or received from the one or more STAs associated with the first AP based at least in part on one or more of the respective signal strengths of wireless packets received by the first AP from the selected APs, the respective levels of interference associated with the selected APs, or respective decoding error rates of the first AP and the selected APs.
29. The first AP of any one or more of clauses 16-28, where the frame includes instructions for each of the selected APs to transmit the scheduling information to the one or more respective STAs associated with the respective selected AP.
30. The first AP of clause 29, where the scheduling information is transmitted to the one or more STAs associated with the first AP as a respective plurality of non-high-throughput (HT) duplicates over a corresponding plurality of subchannels of the wireless medium.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a first access point (AP), comprising:
   selecting one or more other APs for participation with the first AP in a coordinated access point transmission session on a wireless medium, the one or more selected APs associated with respective other basic service sets (OBSSs) that are different than a first basic service set (BSS) associated with the first AP;
   transmitting a frame indicating scheduling information for uplink (UL) or downlink (DL) transmissions to or from each of the selected APs during at least a portion of a transmission opportunity (TXOP) obtained by the first AP, the scheduling information indicating a respective start time for the respective UL or DL transmissions to or from each of the selected APs during the portion of the TXOP, at least two of the start times being offset from one another by a time period associated with decoding a preamble of a wireless packet associated with determining whether the wireless packet is an intra-BSS packet or an OBSS packet; and
   transmitting or receiving one or more wireless packets to or from one or more stations (STAs) associated with the first AP at least partially concurrently with the transmission or reception of one or more respective wireless packets by each of the selected APs to or from one or more respective STAs associated with the respective AP based on the scheduling information.

2. The method of claim 1, wherein the frame indicates whether the coordinated access point transmission session is designated for UL transmissions to or DL transmissions from the selected APs.

3. The method of claim 1, wherein the respective start times of the UL or DL transmissions to or from the selected APs are based at least in part on one or both of signal strengths of wireless packets received by the first AP from the selected APs or levels of interference associated with the selected APs.

4. The method of claim 3, wherein the respective start times of the UL or DL transmissions to or from at least some of the selected APs are the same as one another based at least in part on the respective signal strengths or levels of interference associated with the at least some selected APs being less than a value.

5. The method of claim 3, wherein the respective start times of the UL or DL transmissions to or from the at least two selected APs are offset from one another by the time period based at least in part on the respective signal strengths or levels of interference associated with the at least two selected APs being greater than a value.

6. The method of claim 1, wherein the scheduling information indicates one or more of a respective modulation and coding scheme (MCS) to be used for the UL or DL transmissions to or from each of the selected APs, a respective transmit power level to be used for the UL or DL transmissions to or from each of the selected APs, or a respective duration of the UL or DL transmissions to or from each of the selected APs.

7. The method of claim 6, wherein the respective durations of the UL or DL transmissions to or from the selected APs are the same as one another.

8. The method of claim 6, wherein the respective durations of the UL or DL transmissions to or from at least some of the selected APs are different than one another by a second time period associated with a respective AP of the at least some selected APs decoding a preamble of an acknowledgement (ACK) frame or a block acknowledgement (BA) frame received by the respective AP.

9. The method of claim 1, wherein the frame further indicates respective durations of acknowledgement (ACK) frames or block acknowledgement (BA) frames to be sent by the one or more respective STAs associated with each of the selected APs.

10. The method of claim 9, wherein the respective durations of the ACK frames or the BA frames are the same as one another.

11. The method of claim 1, wherein the frame further indicates an allocation of time or frequency resources for the respective UL or DL transmissions to or from each of the selected APs during at least the portion of the TXOP obtained by the first AP.

12. The method of claim 1, wherein the selecting includes:
   transmitting a poll frame to a plurality of APs associated with BSSs different than the first BSS;
   receiving a request, from each of one or more of the plurality of APs responsive to the poll frame, for the first AP to share a portion of the obtained TXOP with the respective AP; and
   selecting the one or more APs for participation in the coordinated access point transmission session based on the received requests.

13. The method of claim 1, further comprising:
   selectively adjusting a length or duration of each of the one or more wireless packets transmitted to or received from the one or more STAs associated with the first AP based at least in part on one or more of the respective signal strengths of wireless packets received by the first AP from the selected APs, the respective levels of interference associated with the selected APs, or respective decoding error rates of the first AP and the selected APs.

14. The method of claim 1, wherein the frame includes instructions for each of the selected APs to transmit the scheduling information to the one or more respective STAs associated with the respective selected AP.

15. The method of claim 14, wherein the scheduling information is transmitted to the one or more STAs associated with the first AP as a respective plurality of non-high-throughput (HT) duplicates over a corresponding plurality of subchannels of the wireless medium.

16. A first access point (AP), comprising:
   at least one processor; and at least one memory communicatively coupled with the at least one processor and storing processor-readable code that, when executed by the at least one processor, is configured to:
- select one or more other APs for participation with the first AP in a coordinated access point transmission session on a wireless medium, the one or more selected APs associated with respective other basic service sets (OBSSs) that are different than a first basic service set (BSS) associated with the first AP;
- transmit a frame indicating scheduling information for uplink (UL) or downlink (DL) transmissions to or from each of the selected APs during at least a portion of a transmission opportunity (TXOP) obtained by the first AP, the scheduling information indicating a respective start time for the respective UL or DL transmissions to or from each of the selected APs during the portion of the TXOP, at least two of the start times being offset from one another by a time period associated with decoding a preamble of a wireless packet associated with determining whether the wireless packet is an intra-BSS packet or an OBSS packet; and
- transmit or receive one or more wireless packets to or from one or more stations (STAs) associated with the first AP at least partially concurrently with the transmission or reception of one or more respective wireless packets by each of the selected APs to or from one or more respective STAs associated with the respective AP based on the scheduling information.

17. The first AP of claim 16, wherein the frame indicates whether the coordinated access point transmission session is designated for UL transmissions to or DL transmissions from the selected APs.

18. The first AP of claim 16, wherein the respective start times of the UL or DL transmissions to or from the selected APs are based at least in part on one or both of signal strengths of wireless packets received by the first AP from the selected APs or levels of interference associated with the selected APs.

19. The first AP of claim 18, wherein the respective start times of the UL or DL transmissions to or from at least some of the selected APs are the same as one another based at least in part on the respective signal strengths or levels of interference associated with the at least some selected APs being less than a value.

20. The first AP of claim 18, wherein the respective start times of the UL or DL transmissions to or from the at least two selected APs are offset from one another by the time period based at least in part on the determined signal strengths or levels of interference associated with the at least two selected APs being greater than a value.

21. The first AP of claim 16, wherein the scheduling information indicates one or more of a respective modulation and coding scheme (MCS) to be used for the UL or DL transmissions to or from each of the selected APs, a respective transmit power level to be used for the UL or DL transmissions to or from each of the selected APs, or a respective duration of the UL or DL transmissions to or from each of the selected APs.

22. The first AP of claim 21, wherein the respective durations of the UL or DL transmissions to or from the selected APs are the same as one another.

23. The first AP of claim 21, wherein the respective durations of the UL or DL transmissions to or from at least some of the selected APs are different than one another by a second time period associated with a respective AP of the at least some selected APs decoding a preamble of an acknowledgement (ACK) frame or a block acknowledgement (BA) frame received by the respective AP.

24. The first AP of claim 16, wherein the frame further indicates respective durations of acknowledgement (ACK) frames or block acknowledgement (BA) frames to be sent by the one or more respective STAs associated with each of the selected APs.

25. The first AP of claim 24, wherein the respective durations of the ACK frames or the BA frames are the same as one another.

26. The first AP of claim 16, wherein the frame further indicates an allocation of time or frequency resources for the respective UL or DL transmissions to or from each of the selected APs during at least the portion of the TXOP obtained by the first AP.

27. The first AP of claim 16, wherein execution of the processor-readable code for selecting the one or more APs is configured to:
- transmit a poll frame to a plurality of APs associated with BSSs different than the first BSS;
- receive a request, from one or more of the plurality of APs responsive to the poll frame, for the first AP to share a portion of the obtained TXOP with the respective AP; and
- select the one or more APs for participation in the coordinated access point transmission session based on the received requests.

28. The first AP of claim 16, wherein execution of the processor-readable code is further configured to:
- selectively adjust a length or duration of each of the one or more wireless packets transmitted to or received from the one or more STAs associated with the first AP based at least in part on one or more of the respective signal strengths of wireless packets received by the first AP from the selected APs, the respective levels of interference associated with the selected APs, or respective decoding error rates of the first AP and the selected APs.

29. The first AP of claim 16, wherein the frame includes instructions for each of the selected APs to transmit the scheduling information to the one or more respective STAs associated with the respective selected AP.

30. The first AP of claim 29, wherein the scheduling information is transmitted to the one or more STAs associated with the first AP as a respective plurality of non-high-throughput (HT) duplicates over a corresponding plurality of subchannels of the wireless medium.

\* \* \* \* \*